(12) United States Patent (10) Patent No.: US 8,266,948 B2
Ito et al. (45) Date of Patent: Sep. 18, 2012

(54) KNOCKING SENSOR

(75) Inventors: Shingo Ito, Ichinomiya (JP); Daisuke Tahira, Komaki (JP); Katsuki Aoi, Kani (JP)

(73) Assignee: NGK Spark Plug Co., Ltd., Nagoya-shi (JP)

( * ) Notice: Subject to any disclaimer, the term of this patent is extended or adjusted under 35 U.S.C. 154(b) by 703 days.

(21) Appl. No.: 12/502,505

(22) Filed: Jul. 14, 2009

(65) Prior Publication Data

US 2010/0005859 A1 Jan. 14, 2010

(30) Foreign Application Priority Data

Jul. 14, 2008 (JP) ................................. 2008-183030
Mar. 5, 2009 (JP) ................................. 2009-052337

(51) Int. Cl.
*G01L 23/22* (2006.01)
(52) U.S. Cl. ..................................................... 73/35.11
(58) Field of Classification Search ................ 73/35.07, 73/35.09, 35.11, 35.13
See application file for complete search history.

(56) References Cited

U.S. PATENT DOCUMENTS

| | | | | |
|---|---|---|---|---|
| 4,966,031 A | * | 10/1990 | Mochizuki | ................ 73/35.11 |
| 5,440,933 A | * | 8/1995 | Brammer et al. | ............ 73/756 |
| 5,739,418 A | | 4/1998 | Hackel et al. | |
| 6,220,078 B1 | * | 4/2001 | Brammer et al. | ........... 73/35.11 |
| 6,247,351 B1 | * | 6/2001 | Brammer et al. | ........... 73/35.11 |
| 6,532,795 B1 | * | 3/2003 | Brammer et al. | ........... 73/35.11 |
| 6,752,005 B2 | * | 6/2004 | Harada et al. | ............... 73/35.13 |
| 6,923,041 B2 | * | 8/2005 | Harada et al. | ............... 73/35.07 |
| 7,100,426 B2 | * | 9/2006 | Aoi et al. | .................. 73/35.07 |
| 7,475,589 B2 | * | 1/2009 | Kuno et al. | ................. 73/35.11 |

FOREIGN PATENT DOCUMENTS

| | | |
|---|---|---|
| CN | 1162559 A | 10/1997 |
| JP | 2003-517593 A | 5/2003 |
| JP | 2004-257834 A | 9/2004 |

OTHER PUBLICATIONS

Chinese Office Action issued in corresponding Chinese Application No. 200910158557.7 on Aug. 22, 2011.

* cited by examiner

*Primary Examiner* — Freddie Kirkland, III
(74) *Attorney, Agent, or Firm* — Sughrue Mion, PLLC

(57) ABSTRACT

A knocking sensor which includes: a piezoelectric element; a support member having a support body portion, the support body portion including a support surface directly or indirectly supporting the piezoelectric element; and a resin coating covering the piezoelectric element and at least a part of the support member, the resin coating having an outside portion covering an outer circumference of the piezoelectric element and an outer circumference of the support body portion. The support body portion of the support member has a first engagement portion on the base end side thereof. The resin coating has a curved portion which extends from the outside portion toward the interfacial direction inner side, and curves toward the base end side of the support body portion. Further, the curved portion includes a second engagement portion which engages the first engagement portion.

13 Claims, 8 Drawing Sheets

KNOCKING SENSOR

BACKGROUND OF THE INVENTION

1. Field of the Invention

The present invention relates to a knocking sensor that is attached to an engine block or the like of an internal combustion engine and used to detect knocking in the internal combustion engine, and in particular, to a knocking sensor which includes a piezoelectric element, a support member supporting the piezoelectric element, and a resin coating covering the piezoelectric element and at least part of the support member.

2. Description of the Related Art

A knocking sensor is known which is attached to an engine block or the like of an internal combustion engine and used to detect knocking in the internal combustion engine. For example, Patent Documents 1 and 2 describe such a knocking sensor.

A knock sensor (knocking sensor) of Patent Document 1 includes a support member which has a cylindrical pressure sleeve (insertion portion) and a flange-shaped collar portion (support body portion) provided at the base end of the pressure sleeve (see FIG. 1 and related description of Patent Document 1). On an outer circumference of the pressure sleeve, a piezo-ceramic plate (piezoelectric element) or a contact plate, an insulating plate, a mass, and the like are disposed and supported by the collar portion. The piezo-ceramic plate and the like are covered and sealed by a plastic case (resin coating) which is formed by molding.

With this knock sensor, in order to improve the sealing property of the support member and the plastic case, two grooves are provided on the outer circumference of the support member on the leading end side of the pressure sleeve. Two grooves are also provided on the outer circumference of the collar portion.

A knock sensor (knocking sensor) of Patent Document 2 includes a cylindrical core metal (support member) which has a cylinder portion (insertion portion) and a collar portion (support body portion) provided at the base end of the cylinder portion (see FIG. 1 and related description of Patent Document 2). On the outer circumference of the cylinder portion, a piezoelectric element or an electrode plate, an insulating plate, a weight, and the like are disposed and supported by the collar portion. The piezoelectric element and the like are covered and sealed by a resin coating which is formed by molding.

With this knock sensor, in order to improve the sealing property of the cylindrical core metal and the resin coating, two grooves are provided on the outer circumference of the cylindrical core metal on the leading end side of the cylinder portion. Two grooves are also provided on the outer circumference of the collar portion. With this knock sensor, each groove is formed such that the width thereof in the axial direction becomes smaller toward the diameter direction outer side. Consequently, it is unlikely that resin inserted into each groove will fall off or that the resin coating will become separated.

Patent Document 1 JP-T-2003-517593 (the term "JP-T" as used herein means a published Japanese translation of a PCT patent application)

Patent Document 2 JP-A-2004-257834

3. Problems to be Solved by the Invention

However, with the knock sensor of Patent Document 1 and the knock sensor of Patent Document 2 with an improved sealing property of the cylindrical core metal and the resin coating, it is difficult to ensure sufficient seal durability. Further, the knock sensor of Patent Document 2 has a problem in that it is difficult to form the groove.

The invention has been made in consideration of the above, and an object of the invention is to provide a knocking sensor having improved seal durability for a support member and a resin coating.

According to a first aspect, the present invention provides a knocking sensor comprising: a piezoelectric element; a support member having a support body portion, the support body portion including a support surface directly or indirectly supporting the piezoelectric element; and a resin coating covering the piezoelectric element and at least part of the support member, the resin coating having an outside portion covering an outer circumference of the piezoelectric element and an outer circumference of the support body, wherein in an orthogonal direction orthogonal to the support surface, the side which the support surface faces is designated a leading end side and the opposite side is designated a base end side, and in an interfacial direction along the support surface, the side facing the outer sides of the piezoelectric element and the support body portion is designated an interfacial direction outer side, and the side facing the inner sides of the piezoelectric element and the support body portion is designated an interfacial direction inner side, the support body portion of the support member has a first engagement portion on the base end side thereof, the resin coating has a curved portion which extends from the outside portion toward the interfacial direction inner side and which curves toward the base end side of the support body portion, the curved portion including a second engagement portion which engages the first engagement portion.

Further, according to a second aspect, the present invention provides a knocking sensor comprising: an annular piezoelectric element; a support member having a support body portion which includes a support surface directly or indirectly supporting the piezoelectric element, and an insertion portion which extends from the support body portion and is inserted into the piezoelectric element; a resin coating covering the piezoelectric element and at least a part of the support member, wherein in an orthogonal direction orthogonal to the support surface, the side which the support surface faces is designated a leading end side and the opposite side is designated a base end side, and in an interfacial direction along the support surface, the side facing the outer sides of the piezoelectric element and the support body portion is designated an interfacial direction outer side, and the side facing the inner sides of the piezoelectric element and the support body portion is designated an interfacial direction inner side, the resin coating has an outside portion which covers an outer circumference of the piezoelectric element and an outer circumference of the support body portion, and a leading end-side portion which extends from the leading end side of the outside portion and which covers the leading end side of an outer circumference of the insertion portion, and the support member and the resin coating have at least one of a combination of a first engagement portion which is provided on the base end side of the support body portion, and a base end-side curved portion which extends from the outside portion toward the interfacial direction inner side and curves toward the base end side of the support body portion, the base end-side curved portion including a second engagement portion which engages the first engagement portion, and a combination of a third engagement portion which is provided on the leading end side of the insertion portion, and a leading end-side curved portion which is included in the leading end-side portion, extends toward the interfacial direction inner side, and curves toward the leading end side of the insertion portion, the leading end-side curved portion including a fourth engagement portion which engages the third engagement portion.

BRIEF DESCRIPTION OF THE DRAWINGS

Illustrative aspects of the invention will be described in detail with reference to the following figures wherein.

DETAILED DESCRIPTION OF PREFERRED EMBODIMENTS

First Embodiment

Figure 1:
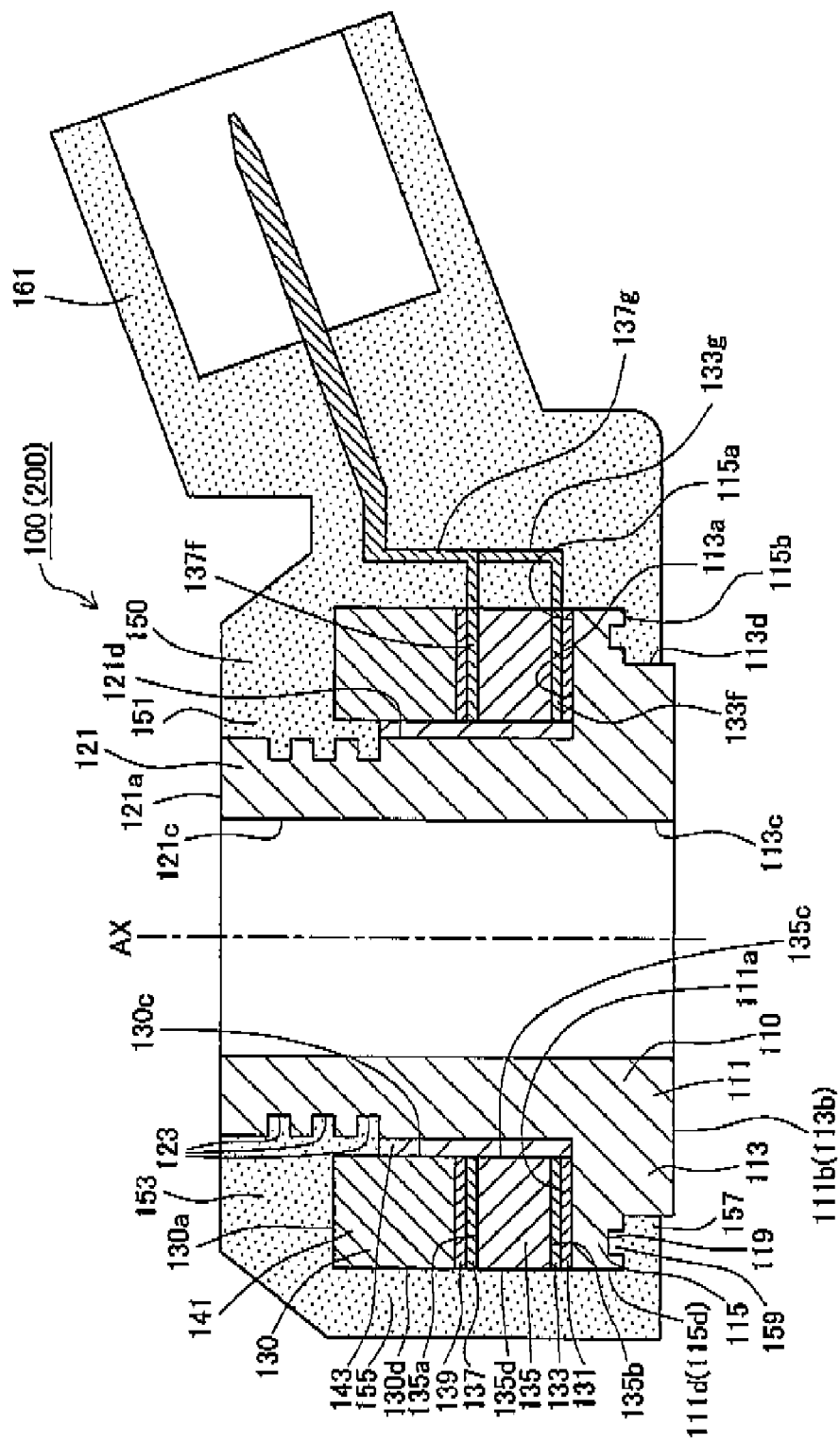
FIG. 1 is a sectional view of a knocking sensor according to a first embodiment.
Figure 2:
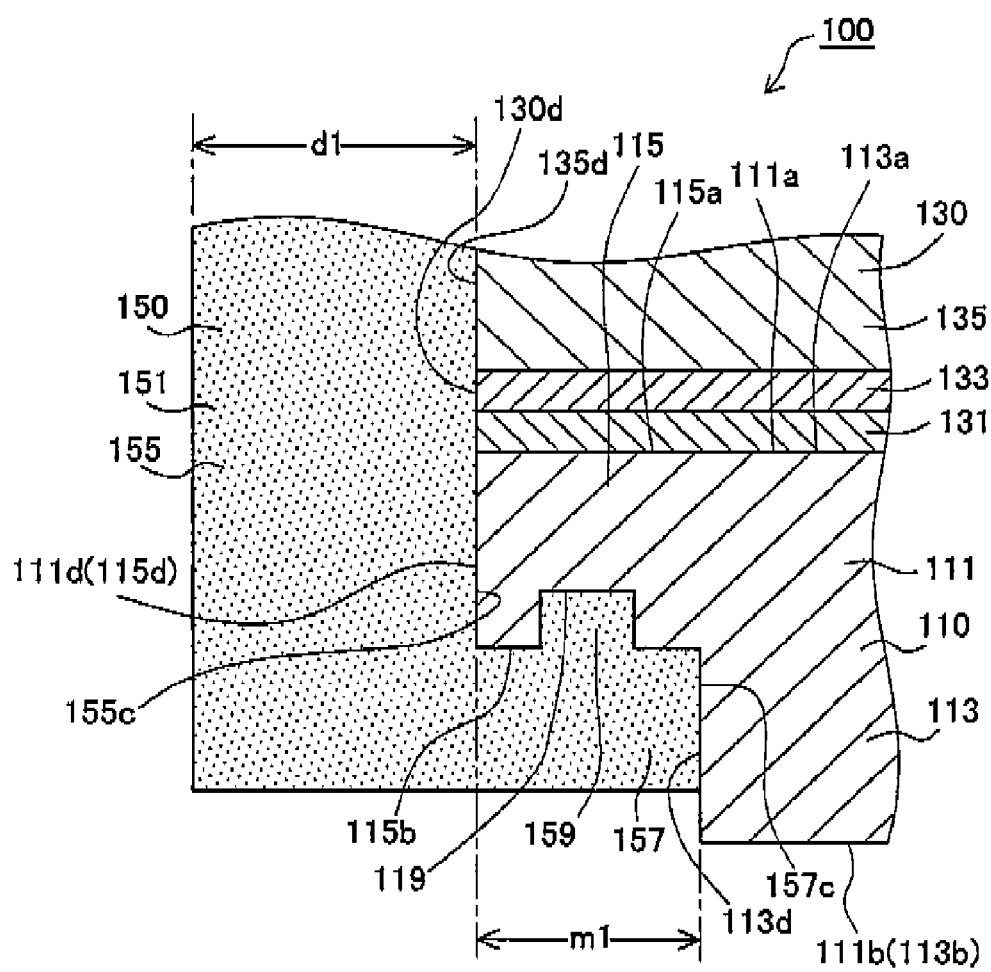
FIG. 2 is a partially enlarged sectional view of the vicinity of a curved portion (base end-side curved portion) of a resin coating in the knocking sensor according to the first embodiment.

Hereinafter, an embodiment of the invention will be described with reference to the drawings. However, the present invention should not be construed as being limited thereto. FIG. 1 shows a knocking sensor 100 according to a first embodiment. FIG. 2 shows the vicinity of a curved portion (base end-side curved portion) 157 of a resin coating 150 in the knocking sensor 100. In FIGS. 1 and 2, the upper side is referred to as a leading end side of an axial (AX) direction (an orthogonal direction orthogonal to a support surface 111a described below), and the lower side is referred to as a base end side of the axial (AX) direction.

The knocking sensor 100 includes a support member 110, a piezoelectric mechanism portion 130 including a piezoelectric element 135 supported by the support member 110, and a resin coating 150 covering the support member 110 and the piezoelectric mechanism portion 130.

Of these, the support member 110 is formed of a metal (specifically, carbon steel having a coefficient of thermal expansion of $1 \times 10^{-5}/°$ C.) as a single body. The support member 110 includes an annular support body portion 111 having an axis AX, and a cylindrical portion (insertion portion) 121 having an outer diameter smaller than that of the support body portion 111 and extending from the support body portion 111 toward the leading end side (in the drawing, upward) along the axis AX.

The support body portion 111 includes a first annular portion 113 positioned on a diameter direction inner side (an interfacial direction inner side of an interfacial direction along a support surface 111a described below), and a second annular portion 115 positioned on a diameter direction outer side of the first annular portion 113 (interfacial direction outer side) and having a length in the axial (AX) direction smaller (around half) than that of the first annular portion 113.

The first annular portion 113 has a leading end surface 113a facing the leading end side, a base end surface 113b facing the base end side, an inner circumferential surface 113c facing the diameter direction inner side (interfacial direction inner side), and an outer circumferential surface 113d facing the diameter direction outer side (interfacial direction outer side). The second annular portion 115 has a leading end surface 115a facing the leading end side, a base end surface 115b facing the base end side, and an outer circumferential surface 115d facing the diameter direction outer side.

The leading end surface 113a of the first annular portion 113 and the leading end surface 115a of the second annular portion 115 are flush with each other, thereby forming the support surface 111a of the support body portion 111. The base end surface 113b of the first annular portion 113 forms a seating surface (base end surface) 111b of the support body portion 111. The seating surface 111b is exposed without being covered with the resin coating 150 described below. The outer circumferential surface 115d of the second annular portion 115 forms an outer circumferential surface (outermost circumferential surface) 111d of the support body portion 111. The support surface 111a supports the piezoelectric element 135 described below and the like. The seating surface 111b comes into contact with a sensor attachment portion (not shown) which is provided in a cylinder block of the internal combustion engine.

At the base end surface 115b of the second annular portion 115 in the support body portion 111, a first engagement annular groove portion (first engagement portion) 119 is provided which has a groove shape, which is recessed toward the leading end side and has an opening on the base end side, and is formed in an annular shape along the outer circumferential surface 111d of the support body portion 111. The first engagement annular groove portion 119 has an inner diameter of Φ20 mm, an outer diameter Φ22 mm, a width of 1 mm, and a depth of 0.5 mm. A second engagement annular projection portion 159 described below is inserted into and closely engaged with the first engagement annular groove portion 119.

The cylindrical portion 121 of the support body portion 111 has a leading end surface 121a positioned at the leading end thereof to face the leading end side, an inner circumferential surface 121c facing the diameter direction inner side, and an outer circumferential surface 121d facing the diameter direction outer side. The leading end surface 121a is exposed without being covered with the resin coating 150 described below. At a predetermined position on the leading end side of the outer circumferential surface 121d of the cylindrical portion 121, three annular groove portions 123, 123 and 123 are recessed in parallel in order to increase adhesiveness to the resin coating 150 described below.

Next, the piezoelectric mechanism portion 130 will be described. The piezoelectric mechanism portion 130 includes a base end-side insulating plate 131, a base end-side electrode member 133, a piezoelectric element 135, a leading end-side electrode member 137, a leading end-side insulating plate 139 and a weight member 141, which are laminated in order from the base end side toward the leading end side.

Of these, the base end-side insulating plate 131 is formed of an insulating material (specifically, PBT which is poly(butylene)terephthalate) in an annular disk shape, is inserted into the cylindrical portion 121 of the support member 110, and is disposed on the support surface 111a of the support body portion 111 of the support member 110. The base end-side insulating plate 131 electrically insulates the support member 110 from the base end-side electrode member 133 described below.

The base end-side electrode member 133 is formed of a metal material (specifically, brass having a coefficient of thermal expansion of $2\times10^{-5}/°$ C.), is inserted into the cylindrical portion 121 of the support member 110, and is disposed on the leading end side of the base end-side insulating plate 131. The base end-side electrode member 133 has an annular disk-shaped annular portion 133f, and a terminal portion 133g extending from the annular portion 133f toward the diameter direction outer side. The annular portion 133f is sandwiched between the base end-side insulating plate 131 and the piezoelectric element 135 described below, and is in contact with the base end surface 135b of the piezoelectric element 135. The terminal portion 133g extends from the annular portion 133f to a connector portion 161 described below while being bent at a predetermined position, thereby forming a conduction path of an electrical signal which is output from the base end surface 135b of the piezoelectric element 135.

The piezoelectric element 135 is formed of a material having a piezoelectric effect (specifically, PZT having a coefficient of thermal expansion of $1\times10^{-5}/°$ C.) in an annular shape, is fined beside the cylindrical portion 121 of the support member 110, and is disposed on the leading end side of the base end-side electrode member 133. The piezoelectric element 135 has a leading end surface 135a, a base end surface 135b forming a rear surface of the leading end surface 135a, and an inner circumferential surface 135c and an outer circumferential surface 135d connecting the leading end surface 135a and the base end surface 135b.

The leading end-side electrode member 137 is formed of a metal material (specifically, brass having a coefficient of thermal expansion of $2\times10^{-5}/°$ C.), is inserted into the cylindrical portion 121 of the support member 110, and is disposed on the leading end surface 135a of the piezoelectric element 135. The leading end-side electrode member 137 has an annular disk-shaped annular portion 137f, and a terminal portion 137g extending from the annular portion 137f toward the diameter direction outer side. The annular portion 137f is sandwiched between the piezoelectric element 135 and the leading end-side insulating plate 139, and is in contact with the leading end surface 135a of the piezoelectric element 135. The terminal portion 137g extends from the annular portion 137f to the connector portion 161 described below while being bent at a predetermined position, thereby forming a conduction path of an electrical signal which is output from the leading end surface 135a of the piezoelectric element 135.

The leading end-side insulating plate 139 is formed of an insulating material (specifically, PET) in an annular disk shape, is fitted beside the cylindrical portion 121 of the support member 110, and is disposed on the leading end side of the leading end-side electrode member 137. The leading end-side insulating plate 139 electrically insulates the leading end-side electrode member 137 from the weight member 141 described below.

The weight member 141 is formed of a metal material (specifically, brass having a coefficient of thermal expansion of $2\times10^{-5}/°$ C.) in an annular shape, is fitted beside the cylindrical portion 121 of the support member 110, and is disposed on the leading end side of the leading end-side insulating plate 139. The weight member 141 is fixed to the cylindrical portion 121 of the support member 110 by an adhesive 143 described below in a state where the leading end-side insulating plate 139 is pressed against the base end side and a predetermined load is applied to the piezoelectric element 135.

An adhesive 143 is filled in a gap between the inner circumferential surface 130c of the piezoelectric mechanism portion 130 (the base end-side insulating plate 131, the base end-side electrode member 133, the piezoelectric element 135, the leading end-side electrode member 137, the leading end-side insulating plate 139, and the weight member 141) and the outer circumferential surface 121d of the cylindrical portion 121 of the support member 110. With the adhesive 143, the base end-side insulating plate 131, the base end-side electrode member 133, the piezoelectric element 135, the leading end-side electrode member 137, the leading end-side insulating plate 139, and the weight member 141 constituting the piezoelectric mechanism portion 130 and the outer circumferential surface 121d of the cylindrical portion 121 are fixed to one another.

Next, the resin coating 150 will be described. The resin coating 150 is formed of insulating resin (specifically, polyamide resin having a coefficient of thermal expansion of $6\times10^{-5}/°$ C.) by molding.

The resin coating 150 has a substantially cylindrical element coating portion 151, and a connector portion 161 extending from the element coating portion 151 to the outside to connect an external connector of an external device (for example, an engine control device or the like).

Of theses, the element coating portion 151 is closely attached to the leading end side and the base end side of the support member 110, and seals the entire piezoelectric mechanism portion 130 between the element coating portion 151 and the support member 110. The element coating portion 151 has a leading end-side portion 153 positioned on the leading end side, an outside portion 155 extending from the base end side of the leading end-side portion 153, and a curved portion (base end-side curved portion) 157 extending from the outside portion 155.

The leading end-side portion 153 has a tapered annular shape such that the diameter thereof decreases on the leading end side. The leading end-side portion 153 is closely attached to and covers a leading end surface 130a of the piezoelectric mechanism portion 130 (the leading end surface of the weight member 141), and is closely attached to and covers the leading end-side portion of the outer circumferential surface 121d in the cylindrical portion 121 of the support member 110. As described above, the three annular groove portions 123, 123 and 123 are formed in the leading end-side portion of the outer circumferential surface 121d of the cylindrical portion 121. Therefore, at that portion, adhesiveness of the resin coating 150 (leading end-side portion 153) and the support member 110 (cylindrical portion 121) is improved, and the sealing property increases.

The outside portion 155 has a cylindrical shape of a uniform diameter direction thickness d1 (in this embodiment, 1.5 mm). The outside portion 155 is closely attached to and covers the outer circumferential surface 130d of the piezoelectric mechanism portion 130 and the outer circumferential surface 111d of the support body portion 111 of the support member 110 (the outer circumferential surface 115d of the second annular portion 115).

The curved portion 157 extends from the outside portion 155 toward the diameter direction inner side, and is provided in an annular shape along the outer circumferential surface 111d of the support body portion 111. The curved portion 157 curves toward the base end side of the support body portion 111. More specifically, the curved portion 157 curves toward the base end surface 115b of the second annular portion 115, and is closely attached to and covers the base end surface 115b. In the curved portion 157, a curved length m1 of the second annular portion 115 toward the base end surface 115b (specifically, when viewed from the diameter direction, the shortest curved length m1 from an inner circumferential surface 155c of the outside portion 155 to an inside end surface 157c of the curved portion 157) is 1.5 mm.

The curved portion 157 is provided with a second engagement annular projection portion (second engagement portion) 159 which has a projection shape, which projects toward the leading end side, and is formed in an annular shape along the inside end surface 157c of the curved portion 157. The second engagement annular projection portion 159 has an inner diameter Φ20 mm, an outer diameter Φ22 mm, a width 1 mm, and a height 0.5 mm. The second engagement annular projection portion 159 is inserted into and closely engaged with the first engagement annular groove portion 119 which is provided on the base end side of the support body portion 111 (second annular portion 115).

In the knocking sensor 100, the seating surface 111b of the support member 110 is brought into contact with the attachment portion of the cylinder block of the internal combustion engine. Further, bolts (not shown) are inserted into the support member 110 from the leading end side, so as to attach the knocking sensor 100 to the internal combustion engine.

If an abnormal vibration, such as knocking or the like, occurs in the internal combustion engine, the abnormal vibration is transferred to the piezoelectric element 135 of the piezoelectric mechanism portion 130 through the support body portion 111 of the support member 110. Then, an electric signal in accordance with the abnormal vibration is output from the base end-side electrode member 133 and the leading end-side electrode member 137 of the piezoelectric element 135 to an external device.

In the knocking sensor 100, the resin coating 150 has a curved portion 157 which curves toward the base end side of the support body portion 111, but the seating surface 111b of the support body portion 111 is exposed without being covered with the resin coating 150 (curved portion 157 or the like). For this reason, when the knocking sensor 100 is attached to the internal combustion engine, the seating surface 111b of the support body portion 111 directly contacts the attachment portion of the engine block without interposing the resin coating 150 therebetween. Therefore, a vibration in the internal combustion engine is easily transferred to the knocking sensor, so that knocking can be further accurately detected.

If the knocking sensor 100 is exposed to a high-temperature environment for a long time or undergoes the repetition of a cooling-heating cycle, the resin material forming the resin coating 150 undergoes deterioration with age, and the resin coating 150 shrinks (so-called heat shrinkage). In particular, a large degree of shrinkage due to deterioration with age mainly arises along the axial (AX) direction of the outside portion 155. For this reason, the outside portion 155 of the resin coating 150 is liable to separate from the lower side (base end side) of the outer circumferential surface 111d of the support body portion 111.

In contrast, according to the first embodiment, the resin coating 150 is provided with the curved portion 157 which is jointed to the outside portion 155 and extends from the outside portion 155, and the curved length m1 of the curved portion 157 is set to be equal to or more than 0.3 times and equal to or less than 6 times (in this embodiment, one time) larger than the thickness d1 of the outside portion 155. The curved portion 157 is positioned on the base end side of the support body portion 111, so as to limit shrinkage of the outside portion 155 in the axial (AX) direction. Therefore, this configuration can prevent the outside portion 155 from shrinking significantly along the axial (AX) direction and separating from the outer circumferential surface 111d of the support body portion 111.

With regard to the curved portion 157 extending from the outside portion 155, the first engagement annular groove portion 119 engages the second engagement annular projection portion 159. Consequently, the second engagement annular projection portion 159 cannot move in the diameter direction. For this reason, even if the resin coating 150 shrinks due to changes with age, the relative movement of the curved portion 157 toward the diameter direction outer side with respect to the support body portion 111 can be effectively prevented. Further, the curved portion 157 can be effectively prevented from being moved and separated from the support body portion 111. Therefore, this configuration can effectively also prevent the outside portion 155 extending from the curved portion 157 from shrinking significantly along the axial (AX) direction and separating from the outer circumferential surface 111d of the support body portion 111.

As described above, in the first embodiment, the effect of the curved portion 157 extending from the outside portion 155 and being positioned on the base end side of the support body portion 111, and the effect of the second engagement annular projection portion 159 engaging the first engagement annular groove portion 119 on the base end side of the support body portion 111 and being provided in the curved portion 157, depend on each other. Thus, even if there is shrinkage due to changes with age in the resin coating 150 (in particular, the outside portion 155), this configuration can effectively prevent the resin coating 150 from separating from the outer circumferential surface 111d of the support body portion 111. Therefore, durability of the seal of the support member 110 and the resin coating 150 can be sufficiently improved.

In the first embodiment, the first engagement annular groove portion 119 is provided in an annular shape in the support member 110, and the annular second engagement annular projection portion 159 which engages the first engagement annular groove portion 119, is provided in the resin coating 150. For this reason, the first engagement annular groove portion 119 and the second engagement annular projection portion 159 can engage with each other over the entire circumference. Further, when the projection portion is inserted into and engages the groove portion, the first engagement annular groove portion 119 and the second engagement annular projection portion 159 can then reliably engage with each other. Therefore, this configuration can further effectively prevent the curved portion 157 from moving toward the diameter direction outer side and separating from the support body portion 111. As a result, durability of the seal of the support member 110 and the resin coating 150 can be further improved.

Next, a method for manufacturing the knocking sensor 100 will be described.

First, while inserting the cylindrical portion 121 of the support member 110, the base end-side insulating plate 131, the base end-side electrode member 133, the piezoelectric element 135, the leading end-side electrode member 137, the leading end-side insulating plate 139, and the weight member 141 are laminated on the support surface 111a of the support body portion 111 in order from the base end side toward the leading end side.

Next, an adhesive 143 is filled in the gap between the inner circumferential surface 130c of the piezoelectric mechanism portion 130 (the base end-side insulating plate 131, the base end-side electrode member 133, the piezoelectric element 135, the leading end-side electrode member 137, the leading end-side insulating plate 139, and the weight member 141) and the outer circumferential surface 121*d* of the cylindrical portion 121. In this case, the respective members of the piezoelectric mechanism portion 130 are adhered and fixed to the cylindrical portion 121 in a state where the weight member 141 is pressed against the base end side and a predetermined load is applied to the piezoelectric element 135.

Next, the components are surrounded by a mold for injection molding, and an insulator resin is injected so as to cover the components, thereby forming the resin coating 150. Thus, the knocking sensor 100 is completed.

Second Embodiment

Figure 3:
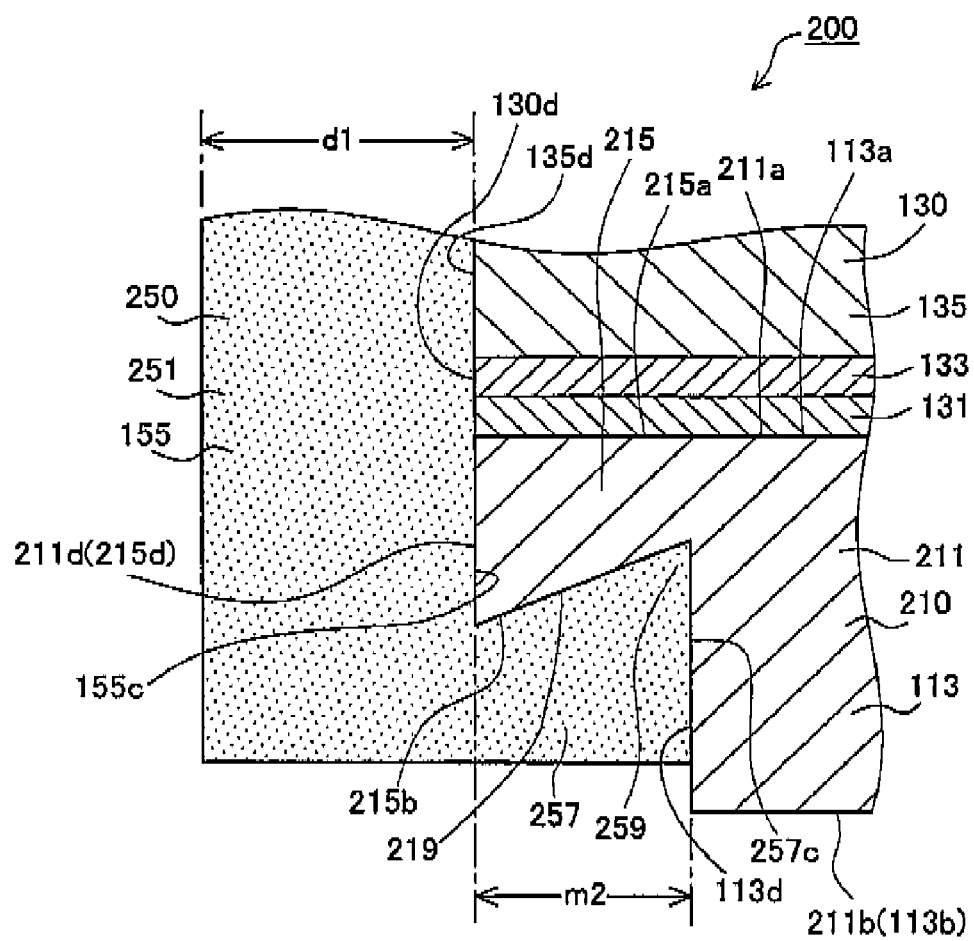
FIG. 3 is a partially enlarged sectional view of the vicinity of a curved portion (base end-side curved portion) of a resin coating in a knocking sensor according to a second embodiment.

Next, a second embodiment will be described. FIG. 3 shows the vicinity of a curved portion (base end-side curved portion) 257 of a resin coating 250 in a knocking sensor 200 according to the second embodiment. In the knocking sensor 200 of the second embodiment, a second annular portion 215 in a support body portion 211 of the support member 210 is different from the second annular portion 115 in the support body portion 111 of the support member 110 according to the first embodiment. Further, a curved portion 257 of the resin coating 250 is different from the curved portion 157 of the resin coating 150 according to the first embodiment. Other parts are basically the same as those in the first embodiment. Thus, descriptions regarding the same parts as those in the first embodiment will be omitted or simplified.

The knocking sensor 200 according to the second embodiment includes a support member 210, the piezoelectric mechanism portion 130 which is the same as in the first embodiment, and a resin coating 250 covering the support member 210 and the piezoelectric mechanism portion 130.

Of these, the support member 210 includes an annular support body portion 211, and the cylindrical portion 121 which is the same as in the first embodiment. The support body portion 211 includes the first annular portion 113 which is the same as in the first embodiment, and a second annular portion 215 which is positioned on the diameter direction outer side of the first annular portion 113 and has a length in the axial (AX) direction smaller than that of the first annular portion 113.

The second annular portion 215 has a leading end surface 215*a* facing the leading end side, a base end surface 215*b* formed on the base end side, and an outer circumferential surface 215*d* facing the diameter direction outer side. The leading end surface 113*a* of the first annular portion 113 and the leading end surface 215*a* of the second annular portion 215 are flush with each other, thereby forming a support surface 211*a* of the support body portion 211. The base end surface 113*b* of the first annular portion 113 forms a seating surface (base end surface) 211*b* of the support body portion 211. The outer circumferential surface 215*d* of the second annular portion 215 forms an outer circumferential surface (outermost circumferential surface) 211*d* of the support body portion 211.

At the base end side of the second annular portion 215 in the support body portion 211, a first engagement tapered concave portion (first engagement portion) 219 is provided so as to be recessed increasingly toward the leading end side when approaching the diameter direction inner side, and is formed in an annular shape along the outer circumferential surface 211*d* of the support body portion 211. A second engagement tapered convex portion 259 described below is inserted into and closely engages the first engagement tapered concave portion 219.

The resin coating 250 includes a substantially cylindrical element coating portion 251, and a connector portion 161 which is the same as in the first embodiment. The element coating portion 251 includes the leading end-side portion 153 and the outside portion 155 which are the same as in the first embodiment, and a curved portion (base end-side curved portion) 257 which is different from that in the first embodiment.

The curved portion 257 extends from the outside portion 155 toward the diameter direction inner side, and is provided in an annular shape along the outer circumferential surface 211*d* of the support body portion 211. The curved portion 257 curves toward the base end side of the support body portion 211. More specifically, the curved portion 257 curves toward the base end surface 215*b* of the second annular portion 215. In the curved portion 257, a curved length m2 of the second annular portion 215 toward the base end surface 215*b* (specifically, when viewed in the diameter direction, the shortest curved length m2 from the inner circumferential surface 155*c* of the outside portion 155 to an inside end surface 257*c* of the curved portion 257) is 0.6 mm.

The curved portion 257 is provided with a second engagement tapered convex portion (second engagement portion) 259 which projects increasingly toward the leading end side when approaching the diameter direction inner side, and is formed in an annular shape along the inside end surface 257*c* of the curved portion 257. The second engagement tapered convex portion 259 is inserted into and closely engages the first engagement tapered concave portion 219 which is provided on the base end side of the support body portion 211.

If the knocking sensor 200 of the second embodiment is exposed to a high-temperature environment for a long period of time or undergoes repetition of a cooling-heating cycle, the resin material of the resin coating 250 undergoes deterioration with age, and the resin coating 250 shrinks. In particular, a large degree of shrinkage due to deterioration with age mainly arises along the axial (AX) direction of the outside portion 155. For this reason, the outside portion 155 of the resin coating 250 is liable to separate from the base end side of the outer circumferential surface 211*d* of the support body portion 211.

In contrast, according to the second embodiment, the resin coating 250 is provided with the curved portion 257 extending from the outside portion 155, and the curved length m2 of the curved portion 257 is set to be equal to or more than 0.3 times and equal to or less than 6 times (in this embodiment, 0.4 times) larger than the thickness d1 of the outside portion 155. The curved portion 257 is positioned on the base end side of the support body portion 211, so that shrinkage of the outside portion 155 in the axial (AX) direction is limited. Therefore, this configuration can prevent the outside portion 155 from shrinking significantly along the axial (AX) direction and separating from the outer circumferential surface 211*d* of the support body portion 211.

With regard to the curved portion 257 extending from the outside portion 155, the first engagement tapered concave portion 219 engages the second engagement tapered convex portion 259, so that second engagement tapered convex portion 259 cannot be moved in the diameter direction. For this reason, even if the resin coating 250 shrinks due to changes with age, this configuration can prevent the relative movement of the curved portion 257 toward the diameter direction outer side with respect to the support body portion 211, and can effectively prevent the curved portion 257 from moving and separating from the support body portion 211. Therefore, this configuration can also effectively prevent the outside portion 155 extending from the curved portion from shrinking significantly along the axial (AX) direction and separating from the outer circumferential surface 211d of the support body portion 211.

As described above, according to the second embodiment, the effect of the curved portion 257 extending from the outside portion 155 and being positioned on the base end side of the support body portion 211, and the effect of the second engagement tapered convex portion 259 engaging the first engagement tapered concave portion 219 on the base end side of the support body portion 211 and being provided in the curved portion 257, depend on each other. Thus, even if there is shrinkage due to changes with age in the resin coating 250 (in particular, the outside portion 155), this configuration can effectively prevent the resin coating 250 from separating from the outer circumferential surface 211d of the support body portion 211. Therefore, durability of the seal of the support member 210 and the resin coating 250 can be sufficiently improved. Other parts which are the same as those in the first embodiment exhibit the same advantages as in the first embodiment.

Third Embodiment

Figure 4:
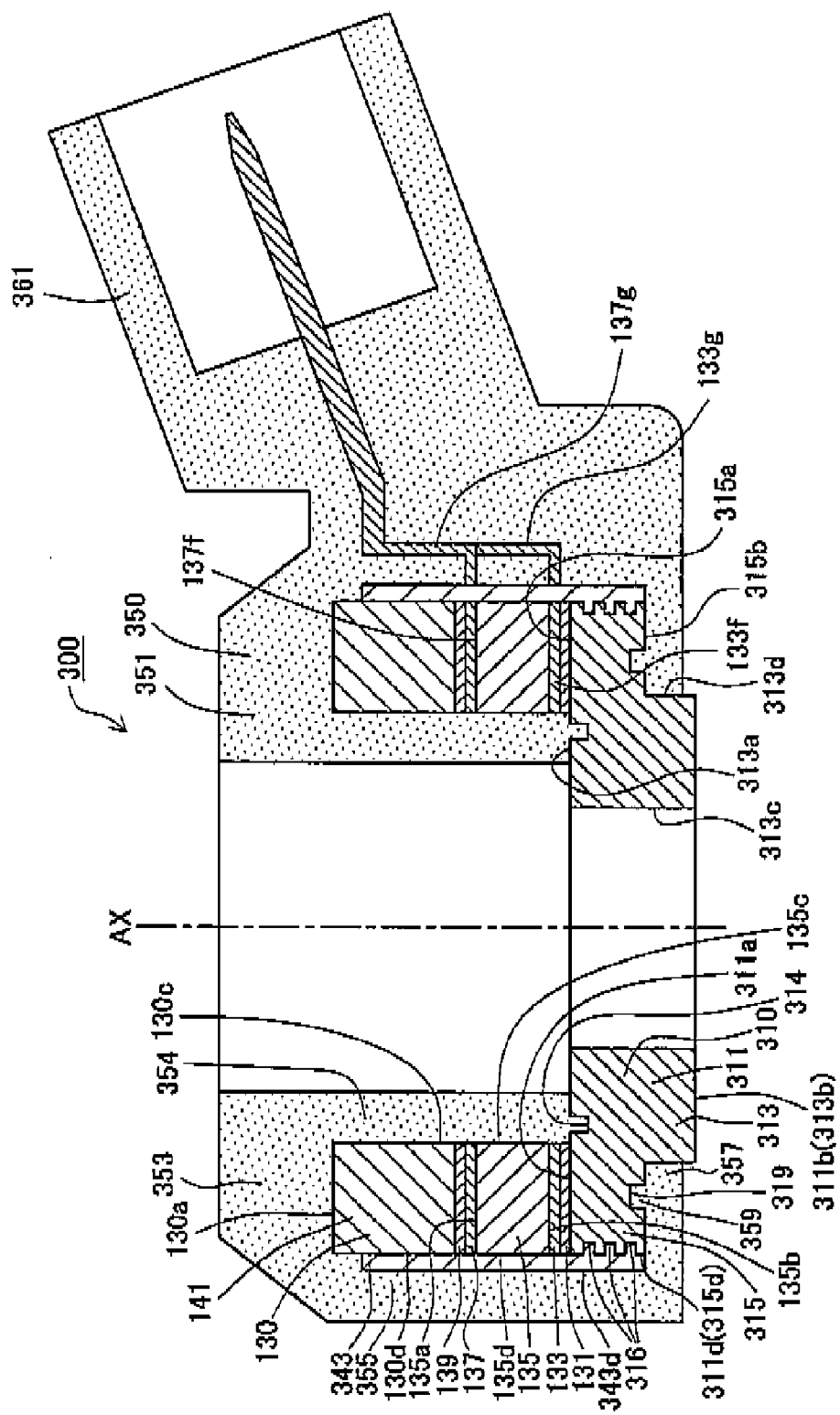
FIG. 4 is a sectional view of a knocking sensor according to a third embodiment.
Figure 5:
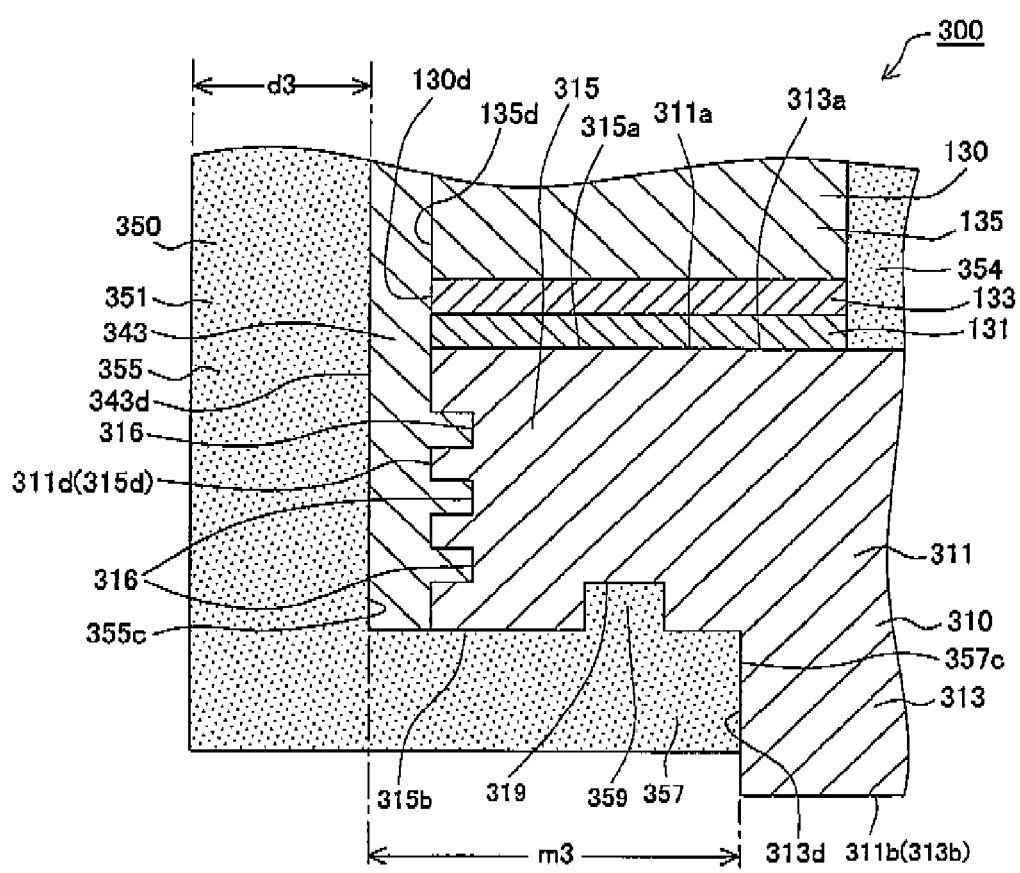
FIG. 5 is a partially enlarged sectional view of the vicinity of a curved portion (base end-side curved portion) of a resin coating in the knocking sensor according to the third embodiment.

Next, a third embodiment will be described. FIG. 4 shows a knocking sensor 300 according to the third embodiment. FIG. 5 shows the vicinity of a curved portion (base end-side curved portion) 357 of a resin coating 350 in the knocking sensor 300. In the knocking sensor 300 of the third embodiment, a support member 310 and a resin coating 350 are different from the support member 110 or 210 and the resin coating 150 or 250 according to the first or second embodiment. The third embodiment is different from the first or second embodiment in that an exterior member 343 is provided on the diameter direction outer side of the support member 310 and the piezoelectric mechanism portion 130. Other parts are the same as those in the first or second embodiment, and thus descriptions regarding the same parts as those in the first or second embodiment will be omitted or simplified.

The support member 310 of the third embodiment includes only an annular support body portion 311 having an axis AX. That is, the support member 310 is configured such that there is no portion corresponding to the cylindrical portion (insertion portion) 121 in the support member 110 or 210 of the first or second embodiment. The support body portion 311 includes a first annular portion 313 which is positioned on the diameter direction inner side, and a second annular portion 315 which is positioned on the diameter direction outer side of the first annular portion 313 and has a length in the axial (AX) length smaller than that of the first annular portion 313.

The first annular portion 313 of the support body portion 311 has a leading end surface 313a facing the leading end side, a base end surface 313b facing the base end side, and an inner circumferential surface 313c facing the diameter direction inner side. The second annular portion 315 has a leading end surface 315a facing the leading end side, a base end surface 315b facing the base end side, and an outer circumferential surface 315d facing the diameter direction outer side. The leading end surface 313a of the first annular portion 313 and the leading end surface 315a of the second annular portion 315 are flush with each other, thereby forming a support surface 311a of the support body portion 311. The base end surface 313b of the first annular portion 313 forms a seating surface (base end surface) 311b of the support member 310. The outer circumferential surface 315d of the second annular portion 315 forms an outer circumferential surface (outermost circumferential surface) 311d of the support body portion 311.

At the base end surface 315b of the second annular portion 315 in the support body portion 311, a first engagement annular groove portion (first engagement portion) 319 is formed which has a groove shape, which is recessed toward the leading end side and has an opening on the base end side, and is formed in an annular shape along the outer circumferential surface 311d of the support body portion 311. A second engagement annular projection portion 359 described below is inserted into and closely engaged with the first engagement annular groove portion 319.

At the outer circumferential surface 315d of the second annular portion 315, three annular groove portions 316, 316 and 316 are recessed in parallel in order to increase adhesiveness to the exterior member 343 described below.

The piezoelectric mechanism portion 130 is the same as in the first or second embodiment. That is, the piezoelectric mechanism portion 130 includes the base end-side insulating plate 131, the base end-side electrode member 133, the piezoelectric element 135, the leading end-side electrode member 137, the leading end-side insulating plate 139 and the weight member 141, which are laminated in order from the base end side toward the leading end side, and supported by the support surface 311a of the support member 310.

In the third embodiment, the piezoelectric mechanism portion 130 is fixed to the support member 310 by an exterior member 343 which is formed of resin on the diameter direction outer side of the piezoelectric mechanism portion 130. Specifically, the cylindrical exterior member 343 extending in the axial (AX) direction is adhered to the outer circumferential surface 130d of the piezoelectric mechanism portion 130 on the leading end side thereof, and is adhered to the outer circumferential surface 311d of the support member 310 (the outer circumferential surface 315d of the second annular portion 315) on the base end side thereof, so that the piezoelectric mechanism portion 130 is fixed to the support member 310.

Next, the resin coating 350 includes an element coating portion 351 and connector portion 361 extending from the element coating portion 351 to the outside.

Of these, the element coating portion 351 includes a leading end-side portion 353 positioned on the leading end side, an inside portion 354 which extends from the leading end-side portion 353 toward the base end side and is positioned on the diameter direction inner side, an outside portion 355 which extends from the leading end-side portion 353 toward the base end side and is positioned on the diameter direction outer side, and a curved portion (base end-side curved portion) 357 extending from the outside portion 355.

The leading end-side portion 353 has a tapered annular shape such that the diameter thereof decreases on the leading end side. The leading end-side portion 353 is closely attached to and covers the leading end surface 130a of the piezoelectric mechanism portion 130.

The inside portion 354 has a cylindrical shape of a uniform diameter direction thickness. The inside portion 354 is closely attached to and covers the inner circumferential surface 130c of the piezoelectric mechanism portion 130, and is closely attached to a portion on the diameter direction inner side in the support surface 311a of the support member 310. The portion on the diameter direction inner side of the support surface 311a is provided with an annular groove portion 314 which has a groove shape, which is recessed toward the base end side and has an opening on the leading end side, and is formed in an annular shape. Therefore, at that portion, adhesiveness of the resin coating 350 (inside portion 354) and the support member 310 is improved, and the sealing property sufficiently increases.

The outside portion 355 has a cylindrical shape of a uniform diameter direction thickness d3 (in this embodiment, 1.5 mm). In the third embodiment, the outside portion 355 is mainly closely attached to an outer circumferential surface 343d of the exterior member 343, whereas a part of the outer circumferential surface 130d of the piezoelectric mechanism portion 130 and the outer circumferential surface 311d of the support body portion 311 are indirectly covered via the exterior member 343.

The curved portion 357 extends from the outside portion 355 toward the diameter direction inner side, and is provided in an annular shape along the outer circumferential surface 311d of the support body portion 311. The curved portion 357 curves toward the base end side of the support body portion 311. More specifically, the curved portion 357 curves toward the base end surface 315b of the second annular portion 315, and is closely attached to and covers the base end surface 315b. In the curved portion 357, a curved length m3 of the second annular portion 315 toward the base end surface 315b (specifically, when viewed in the diameter direction, the shortest curved length m3 from an inner circumferential surface 355c of the outside portion 355 to an inside end surface 357c of the curved portion 357) is 2.1 mm.

The curved portion 357 is provided with a second engagement annular projection portion (second engagement portion) 359 which has a projection shape, which projects toward the leading end side, and is formed in an annular shape along the inside end surface 357c of the curved portion 357. The second engagement annular projection portion 359 is inserted into and closely engages the first engagement annular groove portion 319 which is provided in the second annular portion 315.

If the knocking sensor 300 of the third embodiment is exposed to a high-temperature environment for a long period of time or undergoes the repetition of a cooling-heating cycle, the resin material forming the resin coating 350 undergoes deterioration with age, and the resin coating 350 shrinks. In particular, a large degree of shrinkage due to deterioration with age mainly arises along the axial (AX) direction of the outside portion 355. For this reason, the outside portion 355 of the resin coating 350 is liable to become separated from the base end side of the outer circumferential surface 343d of the exterior member 343.

In contrast, in the third embodiment, the resin coating 350 is provided with the curved portion 357 extending from the outside portion 355, and the curved length m3 of the curved portion 357 is set to be equal to or more than 0.3 times and equal to or less than 6 times (in this embodiment, 1.4 times) larger than the thickness d3 of the outside portion 355. The curved portion 357 is positioned on the base end side of the support body portion 311, so as to limit shrinkage of the outside portion 355 extending from the curved portion 357 in the axial (AX) direction. Therefore, this configuration can prevent the outside portion 355 from shrinking significantly along the axial (AX) direction and separating from the outer circumferential surface 343d of the exterior member 343.

With regard to the curved portion 357 extending from the outside portion 355, the first engagement annular groove portion 319 engages the second engagement annular projection portion 359. Consequently, the second engagement annular projection portion 359 cannot be moved in the diameter direction. For this reason, even if the resin coating 350 shrinks due to changes with age, the relative movement of the curved portion 357 toward the diameter direction outer side with respect to the support body portion 311 can be effectively prevented. Further, this configuration can effectively prevent the curved portion 357 from separating from the support body portion 311.

As described above, according to the third embodiment, the effect of the curved portion 357 extending from the outside portion 355 and being positioned on the base end side of the support body portion 311, and the effect of the second engagement annular projection portion 359 engaging the first engagement annular groove portion 319 on the base end side of the support body portion 311 and being provided in the curved portion 357, depend on each other. Thus, even if there is shrinkage due to changes with age in the resin coating 350 (in particular, the outside portion 355), this configuration can effectively prevent the resin coating 350 from separating from the support body portion 311. Therefore, durability of the seal of the support member 310 and the resin coating 350 can be sufficiently improved. Other parts which are the same as those in the first or second embodiment exhibit the same advantages as in the first or second embodiment.

Next, a method of manufacturing the knocking sensor 300 will be described.

First, the piezoelectric mechanism portion 130 (the base end-side insulating plate 131, the base end-side electrode member 133, the piezoelectric element 135, the leading end-side electrode member 137, the leading end-side insulating plate 139, and the weight member 141) is disposed on the support surface 311a of the support member 310.

Thereafter, resin is applied to the outer circumferential surface 130d of the piezoelectric mechanism portion 130 and the outer circumferential surface 311d of the support body portion 311 and cured, thereby forming the exterior member 343. In this case, the weight member 141 is pressed against the base end side, and a predetermined load is applied to the piezoelectric element 135.

Next, the components are surrounded by a mold for injection molding, and an insulator resin is injected so as to cover the components, thereby forming the resin coating 350. Thus, the knocking sensor 300 is completed.

Fourth Embodiment

Figure 6:
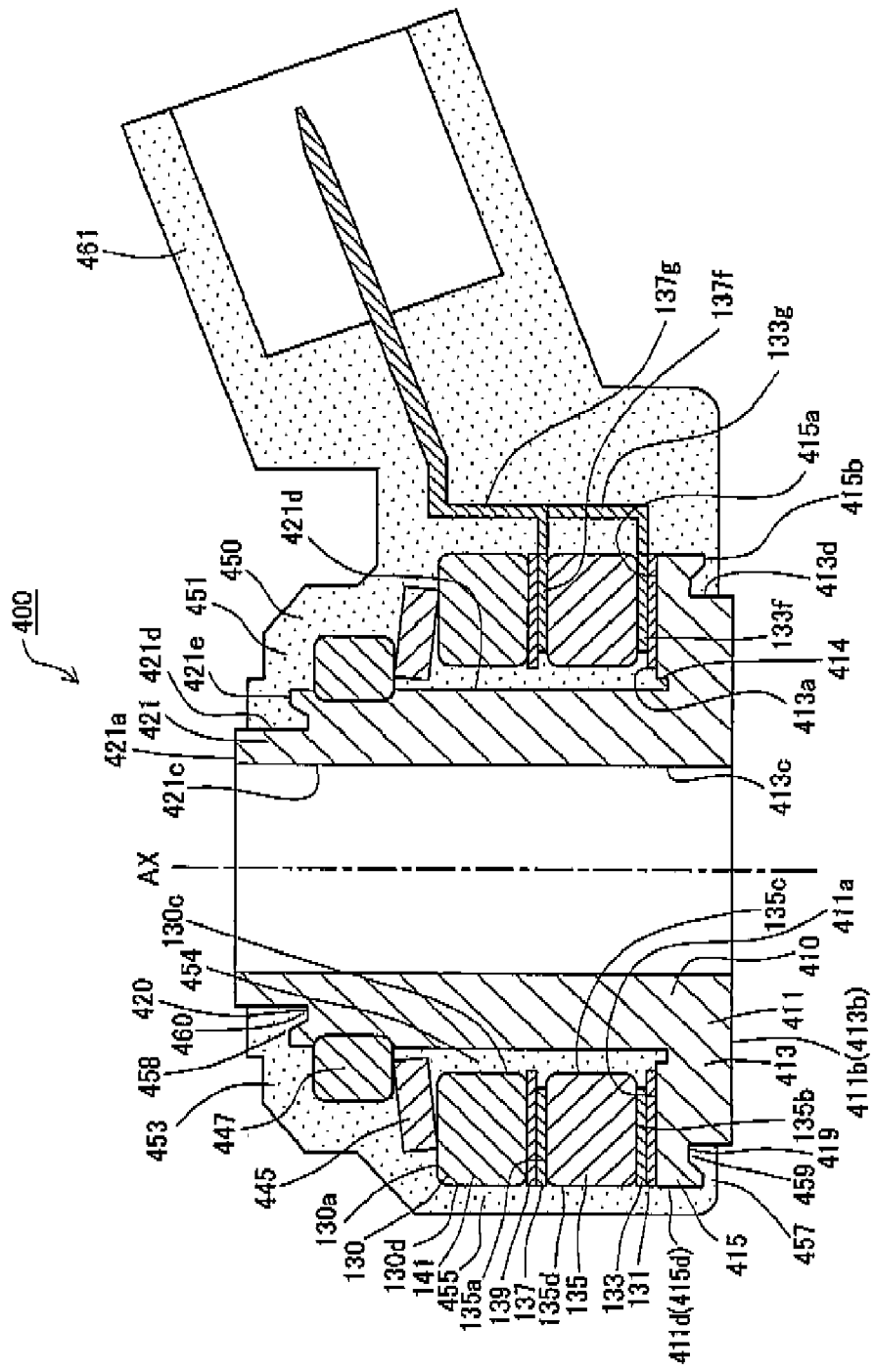
FIG. 6 is a sectional view of a knocking sensor according to a fourth embodiment.
Figure 7:
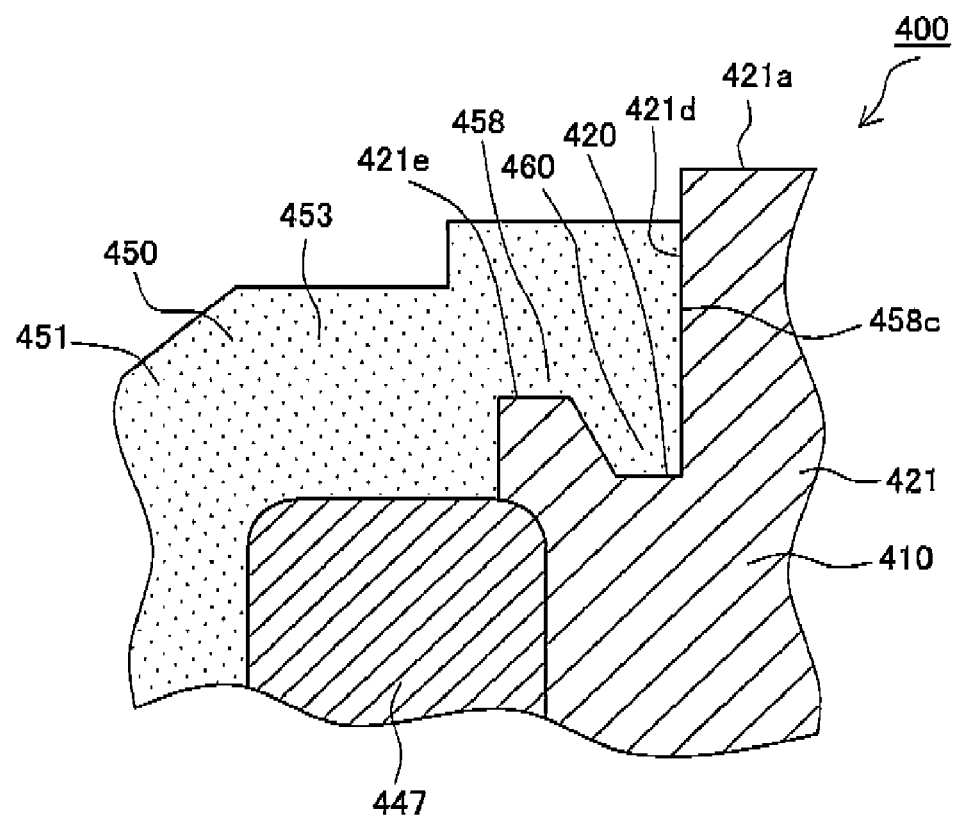
FIG. 7 is a partially enlarged sectional view of the vicinity of a curved portion (leading end-side curved portion) of a resin coating in the knocking sensor according to the fourth embodiment.
Figure 8:
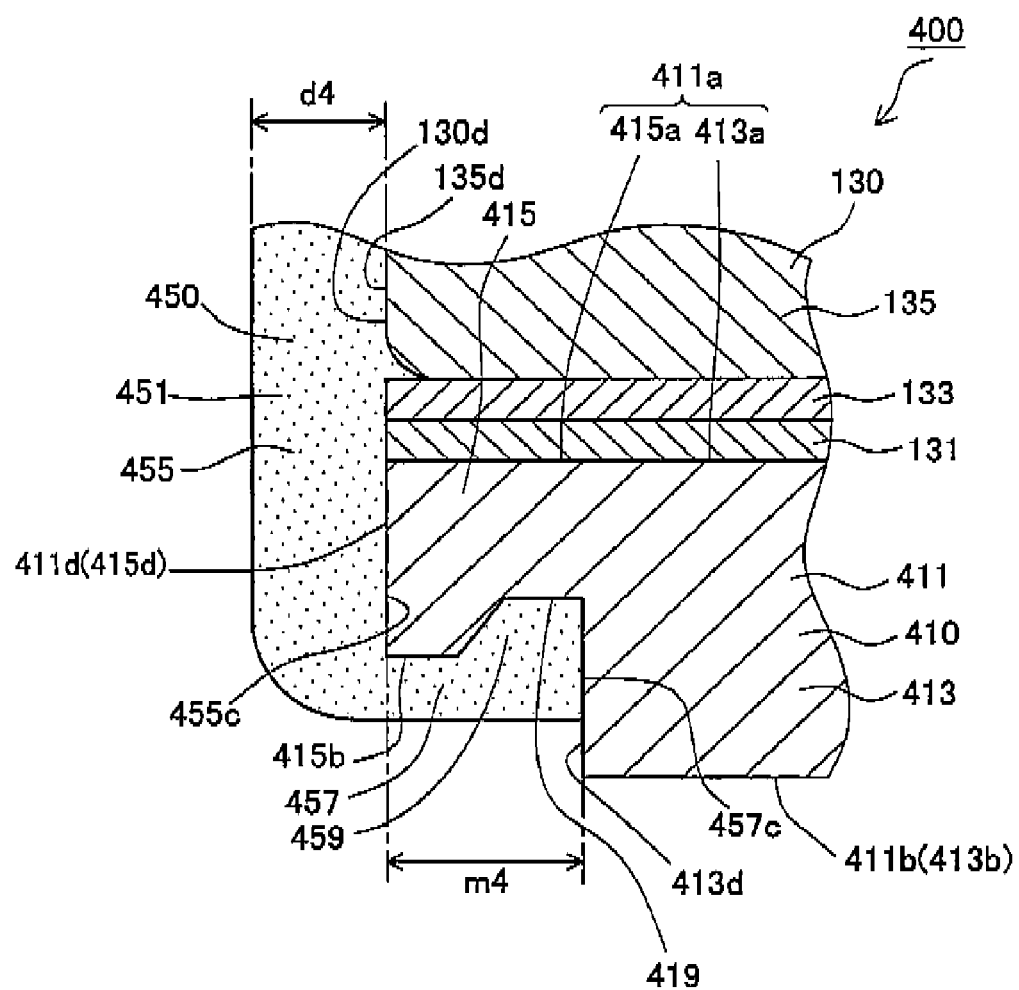
FIG. 8 is a partially enlarged sectional view of the vicinity of a curved portion (base end-side curved portion) of a resin coating in a knocking sensor according to the fourth embodiment.

Next, a fourth embodiment will be described. FIG. 6 shows a knocking sensor 400 according to the fourth embodiment. FIG. 7 shows the vicinity of a leading end-side curved portion 458 of a resin coating 450 in the knocking sensor 400. FIG. 8 shows the vicinity of a base end-side curved portion 457 of a resin coating 450. Descriptions regarding the same parts as those in any one of the first to third embodiments will be omitted or simplified.

A support member 410 of the knocking sensor 400 according to the fourth embodiment includes an annular support body portion 411 having the axis (AX), and a cylindrical portion (insertion portion) 421 extending from the support body portion 411 toward the leading end side (in FIG. 6, upward) along the axial (AX) direction.

Of these, the support body portion 411 includes a first annular portion 413 which is positioned on the diameter direction inner side, and a second annular portion 415 which is positioned on the diameter direction outer side of the first annular portion 413. The first annular portion 413 has a leading end surface 413a, a base end surface 413b, an inner circumferential surface 413c, and an outer circumferential surface 413d. The second annular portion 415 has a leading end surface 415a, a base end surface 415b, and an outer circumferential surface 415d. The leading end surface 413a of the first annular portion 413 and the leading end surface 415a of the second annular portion 415 are flush with each other, thereby forming a support surface 411a of the support body portion 411. The base end surface 413b of the first annular portion 413 forms a seating surface (base end surface) 411b of the support body portion 411. The seating surface 411b is exposed without being covered with the resin coating 450 described below. The outer circumferential surface 415d of the second annular portion 415 forms an outer circumferential surface (outermost circumferential surface) 411d of the support body portion 411.

At the base end surface 415b of the second annular portion 415 in the support body portion 411, a first engagement annular groove portion (first engagement portion) 419 is provided which has a groove shape, which is recessed toward the leading end side and has an opening on the base end side, and which is formed in an annular shape along the outer circumferential surface 411d of the support body portion 411. A second engagement annular projection portion 459 is inserted into and closely engages the first engagement annular groove portion 419.

At the leading end surface 413a of the first annular portion 413, an annular groove portion 414 is provided which has a groove shape, which is recessed toward the base end side and has an opening on the leading end side, and which is formed in an annular shape.

The cylindrical portion 421 of the support body portion 411 has a leading end surface 421a which is positioned at the leading end thereof and faces the leading end side, an inner circumferential surface 421c facing the diameter direction inner side, and an outer circumferential surface 421d facing the diameter direction outer side. The leading end surface 421a is exposed without being covered with the resin coating 450 described below.

An outside portion at the leading end of the cylindrical portion 421 has a stepped shape having an intermediate surface 421e, which is positioned closer to the base end side than the leading end surface 421a and is parallel to the leading end surface 421a. The intermediate surface 421e is provided with a third engagement annular groove portion (third engagement portion) 420 which has a groove shape, which is recessed toward the base end side and has an opening on the leading end side, and which is formed in an annular shape along the outer circumferential surface 421d of the cylindrical portion 421. A fourth engagement annular projection portion 460 described below is inserted into and closely engages the third engagement annular groove portion 420.

Similar to the first embodiment, the piezoelectric mechanism portion 130 includes the base end side insulating plate 131, the base end-side electrode member 133, the piezoelectric element 135, the leading end-side electrode member 137, the leading end-side insulating plate 139 and the weight member 141, which are laminated in order from the base end side toward the leading end side.

At the leading end side of the piezoelectric mechanism portion 130, a nut 447 is disposed which is screwed into the cylindrical portion 421 of the support member 410 through a disc spring 445. Accordingly, the piezoelectric mechanism portion 130 is pressed against the base end side toward the support body portion 411 of the support member 410, is sandwiched between the nut 447 and the support body portion 411, and is fixed to the support member 410.

Next, the resin coating 450 will be described. The resin coating 450 includes an element coating portion 451 and a connector portion 461.

Of these, the element coating portion 451 is closely attached to the leading end side and the base end side of the support member 410, and seals the piezoelectric mechanism portion 130 and the like between the element coating portion 451 and the support member 410. The element coating portion 451 includes a leading end-side portion 453 which is positioned on the leading end side and includes a leading end-side curved portion 458, an outside portion 455 extending from the base end side of the leading end-side portion 453, a base end-side curved portion 457 extending from the outside portion 455, and an inside portion 454 which is disposed on the diameter direction inner side of the disposed piezoelectric mechanism portion 130.

The leading end-side portion 453 has a tapered annular shape such that the diameter thereof decreases on the leading end side. The leading end-side portion 453 is closely attached to and covers the leading end surface 130a of the piezoelectric mechanism portion 130 (the leading end surface of the weight member 141), the disc spring 445 and the nut 447. The leading end-side portion 453 is closely attached to and covers the outside portion at the leading end of the cylindrical portion 421 of the support member 410. Specifically, the leading end-side portion 453 is closely attached to the leading end-side portion of the outer circumferential surface 421d, the intermediate surface 421e and the third engagement annular groove portion 420 in the cylindrical portion 421.

The leading end-side portion 453 has a leading end-side curved portion 458 which extends toward the diameter direction inner side, and is formed in an annular shape along the outer circumferential surface 421d of the cylindrical portion 421. The leading end-side curved portion 458 curves toward the leading end side of the cylindrical portion 421, and more specifically, curves toward the intermediate surface 421e, and is closely attached to and covers the intermediate surface 421e. The leading end-side curved portion 458 is provided with a fourth engagement annular projection portion (fourth engagement portion) 460 which has a projection shape, which projects toward the leading end side, and is formed in an annular shape along an inside end surface 458c of the leading end-side curved portion 458. The fourth engagement annular projection portion 460 is inserted into and closely engaged with the third engagement annular groove portion 420 which is provided on the leading end side of the cylindrical portion 421.

The outside portion 455 has a cylindrical shape of a uniform diameter direction thickness d4 (in this embodiment 1.5 mm). The outside portion 455 is closely attached to and covers the outer circumferential surface 130d of the piezoelectric mechanism portion 130 and the outer circumferential surface 411d of the support body portion 411 of the support member 410 (the outer circumferential surface 415d of the second annular portion 415).

The base end-side curved portion 457 extends from the outside portion 455 toward the diameter direction inner side, and is provided in an annular shape along the outer circumferential surface 411d of the support body portion 411. The base end-side curved portion 457 curves toward the base end side of the support body portion 411. More specifically, the base end-side portion 457 curves toward the base end surface 415b of the second annular portion 415, and is closely attached to and covers the base end surface 415b. In the base end-side curved portion 457, the curved length m4 of the second annular portion 415 toward the base end surface 415b (specifically, when viewed in the diameter direction, the shortest curved length m4 from the inner circumferential surface 455c of the outside portion 455 to the inside end surface 457c of the curved portion 457) is 1.5 mm.

The base end-side curved portion 457 is provided with the second engagement annular projection portion (second engagement portion) 459 which has a projection shape, which projects toward the leading end side, and is formed in an annular shape along the inside end surface 457c of the base end-side curved portion 457. The second engagement annular projection portion 459 is inserted into and closely engages the first engagement annular groove portion 419 which is provided on the base end side of the support body portion 411 (second annular portion 415).

The inside portion 454 has a cylindrical shape of a uniform diameter direction thickness. The inside portion 454 is mainly filled in the gap between the inner circumferential surface 130c of the piezoelectric mechanism portion 130 and the outer circumferential surface 421d of the cylindrical portion 421 of the support member 410, and is closely attached to the inner circumferential surface 130c and the outer circumferential surface 421d. The inside portion 454 is also inserted into and closely attached to the annular groove portion 414 which is formed at the support surface 411a of the support body portion 411.

If the knocking sensor 400 of the fourth embodiment is exposed to a high-temperature environment for a long period of time or undergoes repetition of a cooling-heating cycle, the resin material forming the resin coating 450 undergoes deterioration with age, and the resin coating 450 shrinks. In particular, a large degree of shrinkage due to deterioration with age mainly arises along the axial (AX) direction of the outside portion 455. For this reason, the resin coating 450 is liable to become separated from the leading end side and the base end side of the support member 410.

In contrast, in the fourth embodiment, the leading end-side portion 453 of the resin coating 450 is provided with the leading end-side curved portion 458. The leading end-side curved portion 458 is positioned on the leading end side of the cylindrical portion 421, so that shrinkage of the outside portion 455, which extends from the leading end-side portion 453 including the leading end-side curved portion 458, in the axial (AX) direction, is limited. Therefore, this configuration can prevent the leading end-side portion 453 from separating from the outer circumferential surface 421d of the cylindrical portion 421 since the outside portion 455 shrinks significantly in the axial (AX) direction With regard to the leading end-side curved portion 458, the fourth engagement annular projection portion 460 engages the third engagement annular groove portion 420, so that the fourth engagement annular projection portion 460 cannot be moved in the diameter direction. For this reason, even if the resin coating 450 shrinks due to changes with age, this configuration can prevent the relative movement of the leading end-side curved portion 458 toward the diameter direction outer side with respect to the cylindrical portion 421, and can also prevent the leading end-side curved portion 458 from separating from the cylindrical portion 421.

As described above, the effect of the leading end-side curved portion 458 of the leading end-side portion 453 extending from the outside portion 455 and being positioned on the leading end side of the cylindrical portion 421, and the effect of the fourth engagement annular projection portion 460 engaging the third engagement annular groove portion 420 on the leading end side of the cylindrical portion 421 and being provided in the leading end-side curved portion 458, depend on each other. Thus, even if there is shrinkage due to changes with age in the resin coating 450 (in particular, the outside portion 455), this configuration can effectively prevent the resin coating 450 from separating from the cylindrical portion 421.

In the fourth embodiment, the resin coating 450 is provided with the base end-side curved portion 457 extending from the outside portion 455, and the curved length m4 of the base end-side curved portion 457 is set to be equal to or more than 0.3 times and equal to or less than 6 times (in this embodiment, one time) larger than the thickness d4 of the outside portion 455. The base end-side curved portion 457 is positioned on the base end side of the support body portion 411, so that shrinkage of the outside portion 455 extending from the base end-side curved portion 457 in the axial (AX) direction is limited. Therefore, this configuration can prevent the outside portion 455 from shrinking significantly in the axial (AX) direction and separating from the outer circumferential surface 411d of the support body portion 411.

With regard to the base end-side curved portion 457, the second engagement annular projection portion 459 engages the first engagement annular groove portion 419, so that the second engagement annular projection portion 459 cannot be moved in the diameter direction. For this reason, even if the resin coating 450 shrinks due to changes with age, this configuration can effectively prevent the relative movement of the base end-side curved portion 457 toward the diameter direction outer side with respect to the support body portion 411 and can effectively prevent the base end-side curved portion 457 from separating from the support body portion 411.

As described above, the effect of the base end-side curved portion 457 extending from the outside portion 455 and being positioned on the base end side of the support body portion 411, and the effect of the second engagement annular projection portion 459 engaging the first engagement annular groove portion 419 on the base end side of the support body portion 411 and being provided in the base end-side curved portion 457, depend on each other. Therefore, even if there is shrinkage due to change with age in the resin coating 450 (in particular, the outside portion 455), this configuration can effectively prevent the resin coating 450 from separating from the support body portion 411.

As a result, the knocking sensor 400 of the fourth embodiment can particularly improve durability of the seal of the support member 410 and the resin coating 450.

In the fourth embodiment, the resin coating 450 has a leading end-side curved portion 458 which curves around a part of the leading end side of the cylindrical portion 421, but the leading end surface 421a of the cylindrical portion 421 is exposed without being covered with the resin coating 450 (the leading end-side curved portion 458 and the like). For this reason, when the knocking sensor 400 is attached to the engine block of the internal combustion engine, a bolt for attachment can be brought into direct contact with the leading end surface 421a of the cylindrical portion 421 without interposing the resin coating 450 therebetween. Therefore, the knocking sensor 400 can be reliably attached to the internal combustion engine.

In the fourth embodiment, the resin coating 450 has a base end-side curved portion 457 which curves toward the base end side of the support body portion 411, but the seating surface 411b of the support body portion 411 is exposed without being covered with the resin coating 450 (the base end-side curved portion 457 and the like). For this reason, when the knocking sensor 400 is attached to the internal combustion engine, the seating surface 411b of the support body portion 411 can be brought into direct contact with the attachment portion of the engine block without interposing the resin coating 450 therebetween. Therefore, vibration in the internal combustion engine is easily transferred to the knocking sensor 400, and as a result, a knocking can be further accurately detected.

Other parts which are the same as those in any one of the first to third embodiments exhibit the same advantages as in the first to third embodiments.

Next, a method of manufacturing the knocking sensor 400 will be described.

First, while inserting the cylindrical portion 421 of the support member 410, the piezoelectric mechanism portion 130 (the base end-side insulating plate 131, the base end-side electrode member 133, the piezoelectric element 135, the leading end-side electrode member 137, the leading end-side insulating plate 139, and the weight member 141) is disposed on the support surface 411*a* of the support member 410.

Thereafter, the disc sprint 455 is placed on the piezoelectric mechanism portion 130, and the nut 447 is fastened from above to fix the piezoelectric mechanism portion 130 to the support member 410.

Next, the components are surrounded by a mold for injection molding, and an insulator resin is injected so as to cover the components, thereby forming the resin coating 450. Thus, the knocking sensor 400 is completed.

While the invention has been described in connection with the above embodiments, the invention is not limited to the first to fourth embodiments, and various modifications may be made within the scope of the invention and without departing from the spirit of the invention.

For example, in each of the first to fourth embodiments, the curved portion (base end-side curved portion) 157, 257 or 457 is provided in an annular shape along the outer circumferential surface 111*d*, 211*d*, 311*d* or 411*d* of the support body portion 111, 211, 311 or 411. Alternatively, a plurality of curved portions may be discontinuously formed along the outer circumferential surface 111*d*, 211*d*, 311*d* or 411*d* of the support body portion 111, 211, 311 or 411.

In the first and second embodiments, the piezoelectric mechanism portion 130 is fixed to the support member 110 or 210 by using the adhesive 143, but means for fixing the piezoelectric mechanism portion 130 to the support member 110 or 210 is not limited thereto. For example, as described in the fourth embodiment, a screw portion may be formed at the outer circumferential surface 121*d* of the cylindrical portion 121 of the support member 110 or 210, and a nut member which is screwed into the screw portion may be used. In this case, the piezoelectric mechanism portion 130 is pressed against the base end side toward the support body portion 111 or 211 of the support member 110 or 210, and the piezoelectric mechanism portion 130 is sandwiched between the nut member and the support body portion 111 or 211, so that the piezoelectric mechanism portion 130 is fixed to the support member 110 or 210.

As described above, according to an illustrative aspect of the present invention, a knocking sensor is provided comprising: a piezoelectric element; a support member having a support body portion, the support body portion including a support surface directly or indirectly supporting the piezoelectric element; and a resin coating covering the piezoelectric element and at least a part of the support member, the resin coating having an outside portion covering an outer circumference of the piezoelectric element and an outer circumference of the support body portion, wherein in an orthogonal direction orthogonal to the support surface, the side which the support surface faces is designated a leading end side, and the opposite side is designated a base end side, and in an interfacial direction along the support surface, the side facing the outer sides of the piezoelectric element and the support body portion is designated an interfacial direction outer side, and the side facing the inner sides of the piezoelectric element and the support body portion is designated an interfacial direction inner side, the support body portion of the support member has a first engagement portion on the base end side thereof, the resin coating has a curved portion which extends from the outside portion toward the interfacial direction inner side, and curves toward the base end side of the support body portion, the curved portion including a second engagement portion which engages the first engagement portion.

In the knocking sensor according to the related art, if the resin material forming the resin coating undergoes deterioration with age, an outside portion of the resin coating which covers the outer circumference of the piezoelectric element or the support body portion of the support member separates from the lower side (base end side) of the outer circumference of the support body portion, and a gap is formed between the outside portion of the resin coating and the outer circumference of the support body portion. The reason is as follows. If the knocking sensor is exposed to a high-temperature environment for a long period of time or undergoes the repetition of a cooling-heating cycle, the resin material forming the resin coating undergoes deterioration with age, and the resin coating shrinks (so-called heat shrinkage). A large degree of shrinkage mainly arises along the orthogonal direction orthogonal to the support surface of the outside portion in terms of the structure of the knocking sensor. In particular, if the dimension (height) of the outside portion in a direction along the orthogonal direction is made larger, the degree of shrinkage tends to increase. If the resin coating (outside portion) shrinks in a substantially orthogonal direction, a part of the outside portion, which is inserted into the groove provided on the outer circumference of the support body portion, moves in a direction out of the groove. Further, the outside portion of the resin coating, which covers the outer circumference of the support body portion, separates from the lower side (base end side) of the outer circumference of the support body portion. Accordingly, the present inventors have sought to develop a knocking sensor that can maintain a sufficient sealing property of the resin coating and the support member even if the outside portion of the resin coating shrinks to thereby complete the invention.

That is, in the knocking sensor of the invention, the resin coating is provided with a curved portion which extends from the outside portion thereof and curves toward the base end side of the support body portion of the support member. According to this knocking sensor, even though the resin material forming the resin coating undergoes deterioration with age, and the resin coating (in particular, the outside portion) shrinks in the orthogonal direction orthogonal to the support surface, the curved portion extending from the outside portion is positioned on the base end side of the support body portion, so that the shrinkage of the outside portion in the substantially orthogonal direction is limited.

In this invention, a first engagement portion is provided on the base end side of the support body portion, and the curved portion is provided with a second engagement portion which engages the first engagement portion. Accordingly, even though a large amount of shrinkage of the outside portion occurs in the substantially orthogonal direction, the relative movement of the curved portion toward the interfacial direction outer side with respect to the support body portion can be suppressed by engagement of the first and second engagement portions.

Therefore, according to the invention, the effect of the curved portion extending from the outside portion and being positioned on the base end side of the support body portion, and the effect of the second engagement portion which engages the first engagement portion on the base end side of the support body portion and being provided in the curved portion, depend on each other. Thus, even if there is shrinkage due to deterioration with age in the resin coating (in particular, the outside portion), this configuration can effectively prevent the resin coating from separating from the outer circumference of the support body portion. As a result, durability of the seal of the support member and the resin coating can be improved, as compared with the related art.

As the "support member," for example, a support member which is formed only by an annular support body portion including a support surface, or a support member which is formed by an annular support body portion including a support surface and a cylindrical portion (insertion portion), which is inserted into an annular piezoelectric element, may be exemplified. The material for the "support member" may be appropriately selected taking into consideration rigidity against vibration of the internal combustion engine. For example, an appropriate material may be selected from a metal, ceramic, resin, and the like.

The "support member" directly or indirectly supports the piezoelectric element via the support surface. When the piezoelectric element is indirectly supported, another member, such as an electrode member, an insulating plate, or the like, may be interposed between the support surface and the piezoelectric element.

The material for the "resin coating" may be appropriately selected taking into consideration the sealing property with the support member or heat resistance. The "resin coating" may be formed, for example, by molding.

As the "curved portion" of the resin coating, for example, as described below, a curved portion which is formed in an annular shape along the outer circumference of the support body portion, or a plurality of curved portions which are discontinuously provided along the outer circumference of the support body portion may be exemplified.

The "first engagement portion" of the support member and the "second engagement portion" of the resin coating may be appropriately changed in various ways taking into consideration durability of the seal of the support member and the resin coating, or the like.

For example, as the "first engagement portion," an engagement groove portion which is formed in an annular shape along the outer circumference of the support body portion, or a plurality of engagement groove portions which are arranged along the outer circumference of the support body portion, may be provided. The groove portion may be recessed toward the leading end side and have an opening on the base end side. As the "second engagement portion" which engages the first engagement portion, an engagement projection portion which projects toward the leading end side and is inserted into the engagement groove portion may be provided.

As the "first engagement portion," an engagement projection portion which is formed in an annular shape along the outer circumference of the support body portion, or a plurality of projection portions which are arranged along the outer circumference of the support body portion, may be provided. The projection portion may project toward the base end side. As the "second engagement portion" which engages the first engagement portion, an engagement groove portion which is recessed toward the base end side and has an opening the leading end side, and into which the engagement projection portion is inserted, may be provided.

As the "first engagement portion," an engagement tapered concave portion which is formed in an annular shape along the outer circumference of the support body portion, or a plurality of tapered concave portions which are arranged along the outer circumference of the support body portion, may be provided. The engagement tapered concave portion is formed so as to be recessed increasingly toward the leading end side when approaching the interfacial direction inner side. As the "second engagement portion" which engages the first engagement portion, an engagement tapered convex portion which is formed so as to project increasingly toward the leading end side when approaching the interfacial direction inner side and is inserted into the engagement tapered concave portion, may be provided.

As the "first engagement portion" and the "second engagement portion," a combination of two or more of the engagement groove portion, the engagement projection portion, the engagement tapered concave portion and the engagement tapered convex portion, may be provided.

The same as the "first engagement portion" and the "second engagement portion" is applied to a "third engagement portion" and a "fourth engagement portion" described below.

In the above-described knocking sensor, the curved portion may be provided in an annular shape along the outer circumference of the support body portion.

In this knocking sensor, the curved portion is provided in an annular shape along the outer circumference of the support body portion. The shrinkage of the outside portion extending from the curved portion in the orthogonal direction orthogonal to the support surface is limited over the entire circumference. Therefore, this configuration can further reliably prevent the outside portion from separating from the outer circumference of the support body portion. As a result, durability of the seal of the support member and the resin coating can be further improved.

In the above-described knocking sensor, when viewed in the interfacial direction, in the curved portion, the shortest curved length from an inner circumference of the outside portion to an inside end of the curved portion may be equal to or more than 0.3 times and equal to or less than 6 times larger than the thickness of the outside portion.

In this knocking sensor, the curved length of the curved portion in the resin coating is set to be equal to or more than 0.3 times and equal to or less than 6 times larger than the thickness of the outside portion. Therefore, this configuration can further effectively prevent the curved portion from separating from the support body portion. As a result, durability of the seal of the support member and the resin coating can be further improved.

In the above-described knocking sensor, the first engagement portion may be a first engagement annular groove portion which is recessed toward the leading end side and has an opening on the base end side, and which is formed in an annular shape along the outer circumference of the support body portion. The second engagement portion may be a second engagement projection portion which has an annular projection shape, which projects toward the leading end side, and is inserted into the first engagement annular groove portion.

In his knocking sensor, the first engagement portion is the above-described first engagement annular groove portion, and the second engagement portion is the above-described second engagement annular projection portion which is inserted into the first engagement annular groove portion. For this reason, the first engagement portion and the second engagement portion can engage each other over the entire circumference. Further, the projection portion is inserted into and engages the groove portion, so that the first engagement portion and the second engagement portion can reliably engage each other. Therefore, this configuration can further effectively prevent the curved portion from moving toward the interfacial direction outer side and separating from the support body portion. As a result, durability of the seal of the support member and the resin coating can be further improved.

In the above-described knocking sensor, the support body portion may have a base end surface which is positioned at a base end thereof and which faces the base end side, the base end surface being exposed without being covered with the resin coating.

In this knocking sensor, the resin coating has a curved portion which curves toward the base end side of the support body portion, but the base end surface of the support body portion is exposed without being covered with the resin coating (curved portion or the like). For this reason, when the knocking sensor is attached to an engine block or the like of an internal combustion engine, the base end surface of the support body portion can directly contact an attachment portion of the engine block or the like without the resin coating being interposed therebetween. Therefore, vibration in the internal combustion engine is easily transferred to the knocking sensor, so that knocking can be further accurately detected.

According to an illustrative aspect of the present invention, a knocking sensor is provided comprising: an annular piezoelectric element; a support member having a support body portion which includes a support surface directly or indirectly supporting the piezoelectric element, and an insertion portion which extends from the support body portion and is inserted into the piezoelectric element; a resin coating covering the piezoelectric element and at least a part of the support member, wherein in an orthogonal direction orthogonal to the support surface, the side which the support surface faces is designated a leading end side, and the opposite side is designated a base end side, and in an interfacial direction along the support surface, the side facing the outer sides of the piezoelectric element and the support body portion is designated an interfacial direction outer side, and the side facing the inner sides of the piezoelectric element and the support body portion is designated an interfacial direction inner side, the resin coating has an outside portion which covers an outer circumference of the piezoelectric element and an outer circumference of the support body portion, and a leading end-side portion which extends from the leading end side of the outside portion and covers the leading end side of an outer circumference of the insertion portion, and the support member and the resin coating have at least one of a combination of a first engagement portion which is provided on the base end side of the support body portion, and a base end-side curved portion which extends from the outside portion toward the interfacial direction inner side and curves toward the base end side of the support body portion, the base end-side curved portion including a second engagement portion which engages the first engagement portion, and a combination of a third engagement portion which is provided on the leading end side of the insertion portion, and a leading end-side curved portion which is included in the leading end-side portion, extends toward the interfacial direction inner side, and curves toward the leading end side of the insertion portion, the leading end-side curved portion including a fourth engagement portion which engages the third engagement portion.

In the knocking sensor according to the related art, if the resin material forming the resin coating undergoes deterioration with age, the outside portion of the resin coating which covers the piezoelectric element or the outer circumference of the support member separates from the lower side (base end side) of the outer circumference of the support body portion in the support member, and a gap is generated between the outside portion of the resin coating and the outer circumference of the support body portion. Alternatively, the leading end-side portion of the resin coating separates from the outer circumference leading end side of the insertion portion in the support member, and a gap is generated between the leading end-side portion of the resin coating and the outer circumference leading end side of the insertion portion. The reason is as described above.

In contrast, in the knocking sensor of the invention, the resin coating is provided with at least one of a base end-side curved portion which extends from the outside portion and curves toward the base end side of the support body portion of the support member, and a leading end-side curved portion which is included in a leading end-side portion extending from the outside portion and curves toward the leading end side of the insertion portion of the support member. According to this knocking sensor, even though the resin material forming the resin coating undergoes deterioration with age, and shrinkage in the orthogonal direction orthogonal to the support surface occurs in the resin coating (in particular, the outside portion), the base end-side curved portion extending from the outside portion is positioned on the base end side of the support body portion, so that shrinkage of the outside portion in the substantially orthogonal direction is limited. Alternatively, the leading end-side curved portion of the leading end-side portion extending from the outside portion is positioned on the leading end side of the insertion portion, so that shrinkage of the outside portion in the substantially orthogonal direction is limited.

In the invention, the first engagement portion is provided on the base end side of the support body portion, and the second engagement portion which engages the first engagement portion is provided in the base end-side curved portion. Alternatively, the third engagement portion is provided on the leading end side of the insertion portion, and the fourth engagement portion which engages the third engagement portion is provided in the leading end-side curved portion. Accordingly, even though a large amount of shrinkage of the outside portion in the substantially orthogonal direction occurs, the relative movement of the base end-side curved portion toward the interfacial direction outer side with respect to the support body portion can be suppressed by the engagement of the first and second engagement portions. Alternatively, the relative movement of the leading end-side curved portion toward the interfacial direction outer side with respect to the insertion portion can be suppressed by engagement of the third and fourth engagement portions.

Therefore, according to the invention, the effect of the base end-side curved portion extending from the outside portion and being positioned on the base end side of the support body portion, and the effect of the second engagement portion which engages the first engagement portion on the base end side of the support body portion being provided in the base end-side curved portion, depend on each other. Thus, even if there is shrinkage due to deterioration with age in the resin coating (in particular, the outside portion), this configuration can effectively prevent the resin coating from separating from the outer circumference of the support body portion. Alternatively, the effect of the leading end-side curved portion of the leading end-side portion extending from the outside portion and being positioned on the leading end side of the insertion portion, and the effect of the fourth engagement portion which engages the third engagement portion on the leading end side of the insertion portion and being provided in the leading end-side curved portion, depend on each other. Thus, even if there is shrinkage due to deterioration with age in the resin coating (in particular, the outside portion), this configuration can effective prevent the resin coating from separating from the outer circumference leading end side of the insertion portion.

As a result, durability of the seal of the support member and the resin coating can be improved, as compared with the related art.

As the "base end-side curved portion," for example, as described below, a curved portion which is formed in an annular shape along the outer circumference of the support body portion, or a plurality of curved portions which are discontinuously provided along the outer circumference of the support body portion, may be exemplified. As the "leading end-side curved portion," for example, as described below, a curved portion which is formed in an annular shape along the outer circumference of the insertion portion, or a plurality of curved portions which are discontinuously provided along the outer circumference of the insertion portion, may be exemplified.

In the above-described knocking sensor, the support member and the resin coating may have a combination of the first engagement portion and the base end-side curved portion.

In the above-described knocking sensor, the base end-side curved portion may be provided in an annular shape along the outer circumference of the support body portion.

In this knocking sensor, the base end-side curved portion is provided in an annular shape along the outer circumference of the support body portion. For this reason, shrinkage of the outside portion extending from the base end-side curved portion in the orthogonal direction orthogonal to the support surface is limited over the entire circumference. Therefore, this configuration can further reliably prevent the outside portion from separating from the outer circumference of the support body portion. As a result, durability of the seal of the support member and the resin coating can be further improved.

In the above-described knocking sensor, when viewed in the interfacial direction, in the base end-side curved portion, the shortest curved length from an inner circumference of the outside portion to an inside end of the base end-side curved portion may be equal to or more than 0.3 times and equal to or less than 6 times larger than the thickness of the outside portion.

In this knocking sensor, the curved length of the base end-side curved portion in the resin coating is set to be equal to or more than 0.3 times and equal to or less than 6 times larger than the thickness of the outside portion. Therefore, this configuration can further effectively prevent the base end-side curved portion from separating from the support body portion. As a result, durability of the seal of the support member and the resin coating can be further improved.

In the above-described knocking sensor, the first engagement portion may be a first engagement annular groove portion which has a groove shape, which is recessed toward the leading end side and has an opening on the base end side, and which is formed in an annular shape along the outer circumference of the support body portion. The second engagement portion may be a second engagement projection portion that has an annular projection shape, which projects toward the leading end side, and is inserted into the first engagement annular groove portion.

In this knocking sensor, the first engagement portion is the above-described first engagement annular groove portion, and the second engagement portion is the above-described second engagement annular projection portion which is inserted into the first engagement annular groove portion. For this reason, the first engagement portion and the second engagement portion can engage with each other over the entire circumference. Further, the projection portion is inserted into and engaged with the groove portion, so that the first engagement portion and the second engagement portion can reliably engage with each other. Therefore, this configuration can further effectively prevent the base end-side curved portion from moving toward the interfacial direction outer side and separating from the support body portion. As a result, durability of the seal of the support member and the resin coating can be further improved.

In the above-described knocking sensor, the support body portion may have a base end surface which is positioned at a base end thereof and faces the base end side, the base end surface being exposed without being covered with the resin coating.

In this knocking sensor, the resin coating has a base end-side curved portion which curves toward the base end side of the support body portion, but the base end surface of the support body portion is exposed without being covered with the resin coating (the base end-side curved portion or the like). For this reason, when the knocking sensor is attached to the engine block or the like of the internal combustion engine, the base end surface of the support body portion can directly contact an attachment portion of the engine block or the like without the resin coating being interposed therebetween. Therefore, vibration in the internal combustion engine is easily transferred to the knocking sensor, so that knocking can be further accurately detected.

In the above-described knocking sensor, the support member and the resin coating may have a combination of the third engagement portion and the leading end-side curved portion.

In the above-described knocking sensor, the leading end-side curved portion may be provided in an annular shape along the outer circumference of the insertion portion.

In this knocking sensor, the leading end-side curved portion of the leading end-side portion is provided in an annular shape along the outer circumference of the insertion portion. For this reason, shrinkage of the outside portion extending from the leading end-side portion in the orthogonal direction orthogonal to the support surface is limited over the entire circumference. Therefore, this configuration can further reliably prevent the leading end-side portion from separating from the outer circumference leading end side of the insertion portion. As a result, durability of the seal between the support member and the resin coating can be further improved.

In the above-described knocking sensor, the third engagement portion may be a third engagement annular groove portion which has a groove shape, which is recessed toward the base end side and has an opening on the leading end side, and which is formed in an annular shape along the outer circumference of the insertion portion. The fourth engagement portion may be a fourth engagement annular projection portion which has an annular projection shape, which projects toward the base end side, and is inserted into the third engagement annular groove portion.

In this knocking sensor, the third engagement portion is the above-described third engagement annular groove portion, and the fourth engagement portion is the above-described fourth engagement annular projection portion which is inserted into the third engagement annular groove portion. For this reason, the third engagement portion and the fourth engagement portion can engage each other over the entire circumference. Further, the projection portion is inserted into and engages the groove portion, so the third engagement portion and the fourth engagement portion can reliably engage each other. Therefore, this configuration can further effectively prevent the leading end-side curved portion from moving toward the interfacial direction outer side and separating from the insertion portion. As a result, durability of the seal of the support member and the resin coating can be further improved.

In the above-described knocking sensor, the insertion portion may have a leading end surface which is positioned at a leading end thereof and faces the leading end side, the face end surface being exposed without being covered with the resin coating.

In this knocking sensor, the resin coating has a leading end-side curved portion which curves toward the leading end side of the insertion portion, but the leading end surface of the insertion portion is exposed without being covered with the resin coating (the leading end-side curved portion or the like). For this reason, when the knocking sensor is attached to the engine block or the like of the internal combustion engine, a member for attachment, such as a bolt for attachment or the like, can bring the engine block into direct contact with the insertion portion without the resin coating being interposed therebetween. As a result, the knocking sensor can be further reliably attached to the internal combustion engine.

The present application claims priority from Japanese Patent Application No. 2008-183030 filed on Jul. 14, 2008, and from Japanese Patent Application No. 2009-052337 filed on Mar. 5, 2009, the disclosures of which are incorporated herein by reference in their entirety.

What is claimed is:

1. A knocking sensor comprising:
a piezoelectric element;
a support member having a support body portion, the support body portion including a support surface directly or indirectly supporting the piezoelectric element; and
a resin coating covering the piezoelectric element and at least a part of the support member, the resin coating having an outside portion covering an outer circumference of the piezoelectric element and an outer circumference of the support body portion,
wherein, in an orthogonal direction orthogonal to the support surface, the side which the support surface faces is designated a leading end side, and the opposite side is designated a base end side, and
in an interfacial direction along the support surface, the side facing the outer sides of the piezoelectric element and the support body portion is designated an interfacial direction outer side, and the side facing the inner sides of the piezoelectric element and the support body portion is designated an interfacial direction inner side,
the support body portion of the support member has a first engagement portion on the base end side thereof,
the resin coating has a curved portion which extends from the outside portion toward the interfacial direction inner side, and curves toward the base end side of the support body portion, the curved portion including a second engagement portion which engages the first engagement portion.

2. The knocking sensor according to claim 1,
wherein the curved portion is provided in an annular shape along the outer circumference of the support body portion.

3. The knocking sensor according to claim 2,
wherein, when viewed in the interfacial direction, in the curved portion, the shortest curved length from an inner circumference of the outside portion to an inside end of the curved portion is equal to or more than 0.3 times and equal to or less than 6 times larger than the thickness of the outside portion.

4. The knocking sensor according to claim 2,
wherein the first engagement portion is a first engagement annular groove portion which has a groove shape, which is recessed toward the leading end side and has an opening on the base end side, and which is formed in an annular shape along the outer circumference of the support body portion, and
the second engagement portion is a second engagement annular projection portion which has an annular projection shape, which projects toward the leading end side, and is inserted into the first engagement annular groove portion.

5. The knocking sensor according to claim 1,
wherein the support body portion has a base end surface which is positioned at the base end thereof and faces the base end side, the base end surface being exposed without being covered with the resin coating.

6. A knocking sensor comprising:
an annular piezoelectric element;
a support member having a support body portion which includes a support surface directly or indirectly supporting the piezoelectric element, and an insertion portion which extends from the support body portion and is inserted into the piezoelectric element; and
a resin coating covering the piezoelectric element and at least a part of the support member,
wherein, in an orthogonal direction orthogonal to the support surface, the side which the support surface faces is designated a leading end side, and the opposite side is designated a base end side, and
in an interfacial direction along the support surface, the side facing the outer sides of the piezoelectric element and the support body portion is designated an interfacial direction outer side, and the side facing the inner sides of the piezoelectric element and the support body portion is designated an interfacial direction inner side,
the resin coating has an outside portion which covers an outer circumference of the piezoelectric element and an outer circumference of the support body portion, and a leading end-side portion which extends from the leading end side of the outside portion and covers the leading end side of an outer circumference of the insertion portion, and
the support member and the resin coating have at least one of
a combination of a first engagement portion which is provided on the base end side of the support body portion, and a base end-side curved portion which extends from the outside portion toward the interfacial direction inner side and curves toward the base end side of the support body portion, the base end-side curved portion including a second engagement portion which engages the first engagement portion, and
a combination of a third engagement portion which is provided on the leading end side of the insertion portion, and a leading end-side curved portion which is included in the leading end-side portion, extends toward the interfacial direction inner side, and curves toward the leading end side of the insertion portion, the leading end-side curved portion including a fourth engagement portion which engages the third engagement portion.

7. The knocking sensor according to claim 6,
wherein the support member and the resin coating have a combination of the first engagement portion and the base end-side curved portion, and
the base end-side curved portion is provided in an annular shape along the outer circumference of the support body portion.

8. The knocking sensor according to claim 7,
wherein, when viewed in the interfacial direction, of the base end-side curved portion, the shortest curved length from an inner circumference of the outside portion to an inside end of the base end-side curved portion is equal to or more than 0.3 times and equal to or less than 6 times larger than the thickness of the outside portion.

9. The knocking sensor according to claim 7,
wherein the first engagement portion is a first engagement annular groove portion which has a groove shape, which is recessed toward the leading end side and has an opening on the base end side, and which is formed in an annular shape along the outer circumference of the support body portion, and the second engagement portion is a second engagement annular projection portion which has an annular projection shape, which projects toward the leading end side, and is inserted into the first engagement annular groove portion.

10. The knocking sensor according to claim 7,
wherein the support body portion has a base end surface which is positioned at a base end thereof and faces the base end side, the base end surface being exposed without being covered with the resin coating.

11. The knocking sensor according to claim 6,
wherein the support member and the resin coating has a combination of the third engagement portion and the leading end-side curved portion, and the leading end-side curved portion is provided in an annular shape along the outer circumference of the insertion portion.

12. The knocking sensor according to claim 11,
wherein the third engagement portion is a third engagement annular groove portion which has a groove shape, which is recessed toward the base end side and has an opening on the leading end side, and which is formed in an annular shape along the outer circumference of the insertion portion, and the fourth engagement portion is a fourth engagement annular projection portion which has an annular projection shape, which projects toward the base end side, and is inserted into the third engagement annular groove portion.

13. The knocking sensor according to claim 11,
wherein the insertion portion has a leading end surface which is positioned at a leading end thereof and faces the leading end side, the leading end surface being exposed without being covered with the resin coating.

* * * * *